US008508884B2

(12) United States Patent
Sekii et al.

(10) Patent No.: US 8,508,884 B2
(45) **Date of Patent: *Aug. 13, 2013**

(54) SPINDLE MOTOR INCLUDING MAGNETIC MEMBER AND DISK DRIVE APPARATUS INCLUDING SAME

(71) Applicant: Nidec Corporation, Kyoto (JP)

(72) Inventors: Yoichi Sekii, Kyoto (JP); Hirokazu Shirai, Kyoto (JP); Junya Mizukami, Kyoto (JP); Kazuyoshi Saito, Kyoto (JP); Hideki Nishimura, Kyoto (JP); Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,608

(22) Filed: Dec. 5, 2012

(65) Prior Publication Data

US 2013/0094342 A1 Apr. 18, 2013

Related U.S. Application Data

(63) Continuation of application No. 12/873,430, filed on Sep. 1, 2010, now Pat. No. 8,358,483.

(30) Foreign Application Priority Data

Dec. 8, 2009 (JP) ................................. 2009-278176
Jun. 8, 2010 (JP) ................................. 2010-131022

(51) Int. Cl.
*G11B 19/20* (2006.01)
*H02K 5/24* (2006.01)

(52) U.S. Cl.
USPC .......................................... 360/99.08; 310/90

(58) Field of Classification Search
USPC .................. 360/98.07, 99.08, 99.04; 310/90, 310/67 R
See application file for complete search history.

(56) References Cited

U.S. PATENT DOCUMENTS

| | | | | |
|---|---|---|---|---|
| 6,920,013 | B2 * | 7/2005 | Nishimura et al. | 360/99.08 |
| 7,118,278 | B2 * | 10/2006 | Gomyo et al. | 384/119 |
| 7,460,334 | B2 * | 12/2008 | Yonei et al. | 360/99.08 |
| 7,830,049 | B2 * | 11/2010 | Yoneda et al. | 310/51 |
| 8,120,872 | B2 * | 2/2012 | Sekii et al. | 360/99.08 |

(Continued)

FOREIGN PATENT DOCUMENTS

JP 2011-142793 A 7/2011

OTHER PUBLICATIONS

Sekii et al.; "Spindle Motor and Disk Drive Apparatus"; U.S. Appl. No. 12/873,430, filed Sep. 1, 2010.

*Primary Examiner* — Brian Miller
(74) *Attorney, Agent, or Firm* — Keating & Bennett, LLP

(57) ABSTRACT

A spindle motor includes a stationary portion and a rotating portion. The rotating portion includes a magnet arranged around a central axis extending in a vertical direction. The stationary portion includes a base member and a magnetic member arranged below the magnet and fixed to the base member. The base member includes an upper surface extending out perpendicularly or substantially perpendicularly to the central axis, and a wall surface extending in an axial direction. The magnetic member includes an annular plate portion arranged on the base member and a projecting portion arranged to extend downward from the plate portion. At least a portion of the projecting portion is arranged to be in contact with the wall surface. An adhesive is arranged between the plate portion and the upper surface of the base member and between the projecting portion and the wall surface.

20 Claims, 18 Drawing Sheets

(56) References Cited

U.S. PATENT DOCUMENTS

| | | | | |
|---|---|---|---|---|
| 8,358,483 | B2* | 1/2013 | Sekii et al. | 360/99.08 |
| 2003/0168923 | A1* | 9/2003 | Gomyo et al. | 310/156.01 |
| 2006/0082229 | A1* | 4/2006 | Xu et al. | 310/67 R |
| 2006/0244326 | A1* | 11/2006 | Tamaoka | 310/90 |
| 2011/0134566 | A1 | 6/2011 | Sekii et al. | |
| 2011/0249362 | A1* | 10/2011 | Saichi et al. | 360/99.08 |

* cited by examiner

SPINDLE MOTOR INCLUDING MAGNETIC MEMBER AND DISK DRIVE APPARATUS INCLUDING SAME

BACKGROUND OF THE INVENTION

1. Field of the Invention

The present invention relates to a spindle motor and more specifically to a spindle motor used in a disk drive apparatus.

2. Description of the Related Art

Hard disk apparatuses and optical disk apparatuses are typically provided with a spindle motor to rotate a disk about a central axis. Such spindle motors include a stationary portion fixed to a housing of the apparatus, and a rotating portion arranged to rotate while supporting the disk. The spindle motor is arranged to produce a torque centered on the central axis by a magnetic flux generated between the stationary and rotating portions that works to rotate the rotating portion with respect to the stationary portion.

Some known spindle motors include a magnetic member arranged to attract the rotating portion toward the stationary portion. Such a magnetic member is typically fixed to the stationary portion to produce axial magnetic attraction between it and a magnet provided in the rotating portion. JP-A 2001-309605, for example, describes a conventional magnetic ring attached to a stationary member to apply a downward axial force to a rotor. JP-A 2007-43893, for example, also describes a conventional motor including a ring-shaped magnetic attraction ring fixed to a bottom surface of a motor base.

Concerning a method of fixing such a magnetic member to the stationary portion, paragraph [0034] of JP-A 2001-309605 includes the following explanation: "... the magnetic ring 42 is adhered to the stationary member 21, for example, through an adhesive". This adhesive, however, may deteriorate with a long-term use due to influence of changes in ambient temperature and the like which will result in a reduction in fixing strength of the adhesive. Since magnetic attraction constantly acts between the magnetic ring and the magnet, the deterioration of the adhesive may lead to a displacement of the magnetic ring toward the magnet. Therefore, the type of the adhesive and the amount of the adhesive applied need to be determined appropriately, with the long-term deterioration of the adhesive taken into consideration, to maintain a sufficient fixing strength of the adhesive.

Meanwhile, claim 1 of JP-A2007-43893 describes the following feature: "the attraction ring has a plurality of radially-projecting projecting portions defined in an outer circumferential portion or an inner circumferential portion thereof, and the projecting portions are press fitted to a wall portion provided in the motor base and arranged to project from the bottom surface thereof in an axial direction, so as to be fixed to the motor base". The technique described in JP-A 2007-43893, however, has a problem in that a stress that accompanies the press fitting acts on the entire attraction ring. Therefore, the press fitting may lead to a deformation of the attraction ring as a whole. The deformation of the attraction ring results in variations in the axial distance between the magnet and the attraction ring. This may lead to contact between the magnet and the attraction ring, and the occurrence of undesirable vibrations due to uneven magnetic attraction, or the like.

SUMMARY OF THE INVENTION

A spindle motor according to a preferred embodiment of the present invention includes a stationary portion and a rotating portion. The rotating portion includes a magnet arranged around a central axis extending in a vertical direction. The stationary portion includes a base member and a magnetic member arranged below the magnet and fixed to the base member.

The base member includes an upper surface extending out perpendicularly or substantially perpendicularly to the central axis, and a wall surface extending in an axial direction. The magnetic member preferably includes an annular plate portion arranged on the upper surface of the base member and a projecting portion arranged to extend downward from the plate portion.

At least a portion of the projecting portion is preferably arranged to be in contact with the wall surface. The stationary portion preferably further includes an adhesive arranged between the plate portion and the upper surface of the base member and between the projecting portion and the wall surface.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis extends, and that a side on which a magnet is located with respect to a magnetic member is defined as an upper side. The shape of each member and relative positions of different members will be described based on this assumption. It should be noted, however, that the above definitions of the vertical direction and the upper and lower sides are simply applied to facilitate the description provided herein, and should not be construed to restrict in any way the orientation of a spindle motor or a disk drive apparatus according to any preferred embodiment of the present invention when in actual use.

Figure 1:
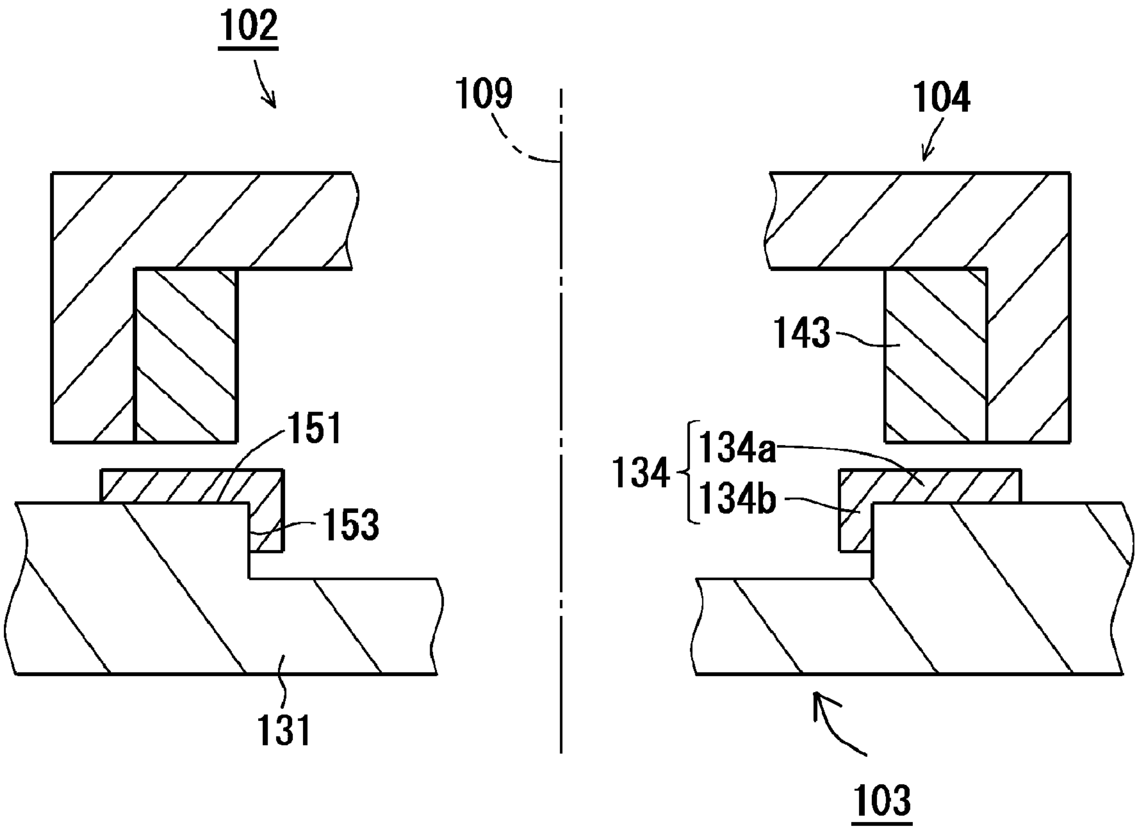
FIG. 1 is a partial vertical cross-sectional view of a spindle motor according to a preferred embodiment of the present invention.

FIG. 1 is a partial vertical cross-sectional view of a spindle motor 102 according to a preferred embodiment of the present invention. As illustrated in FIG. 1, the spindle motor 102 includes a stationary portion 103 and a rotating portion 104. The rotating portion 104 is supported to be rotatable with respect to the stationary portion 103.

The rotating portion 104 includes a magnet 143 arranged around a central axis 109 extending in the vertical direction. The stationary portion 103 includes a base member 131 and a magnetic member 134. The magnetic member 134 is arranged below the magnet 143 and fixed to the base member 131.

The base member 131 includes an upper surface 151 spreading perpendicularly to the central axis 109, and a wall surface 153 extending in an axial direction. The magnetic member 134 includes a plate portion 134*a* and a projecting portion 134*b*. The magnetic member 134 preferably includes a plate portion 134*a* and a projecting portion 134*b*. The plate portion 134*a* includes an annular portion arranged on the upper surface 151 of the base member 131. The projecting portion 134*b* includes a portion extending from the plate portion 134*a* in the axial direction.

In the spindle motor 102, at least a portion of the projecting portion 134*b* is preferably press fitted to the wall surface 153 of the base member 131. Therefore, the strength of the connection by which the magnetic member 134 is fixed to the base member 131 is less likely to significantly decrease due to a long-term use than when they are fixed to each other with only an adhesive. Moreover, because only the projecting portion 134*b* is press fitted to the wall surface 153, a deformation due to the press fitting is unlikely to occur to the plate portion 134*a* of the magnetic member 134.

Next, a preferred embodiment of the present invention will be described more specifically.

Figure 2:
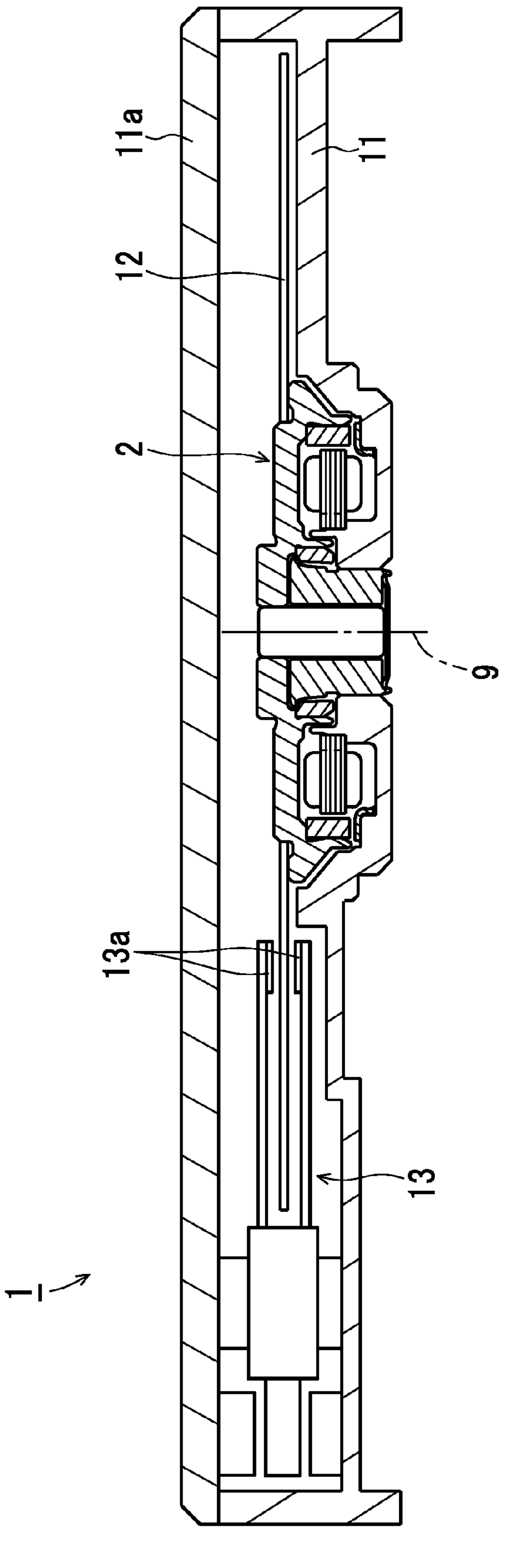
FIG. 2 is a vertical cross-sectional view of a disk drive apparatus according to a preferred embodiment of the present invention.

FIG. 2 is a vertical cross-sectional view of a disk drive apparatus 1 according to a first preferred embodiment of the present invention. The disk drive apparatus 1 is preferably designed to read and write information from or to a magnetic disk 12 (hereinafter referred to simply as the "disk 12") while rotating the disk 12 about a central axis 9. As illustrated in FIG. 2, the disk drive apparatus 1 preferably includes an apparatus housing 11, the disk 12, an access portion 13, and a spindle motor 2.

The apparatus housing 11 is arranged to contain the disk 12, the access portion 13, and the spindle motor 2. An upper portion of the apparatus housing 11 is preferably closed with a cover portion 11*a*. The access portion 13 is designed to read and write information from or to the disk 12 while moving a head 13*a* along a recording surface of the disk 12 supported by the spindle motor 2. Note that the access portion 13 may be designed to perform only one of reading and writing of information from or to the disk 12.

Figure 3:
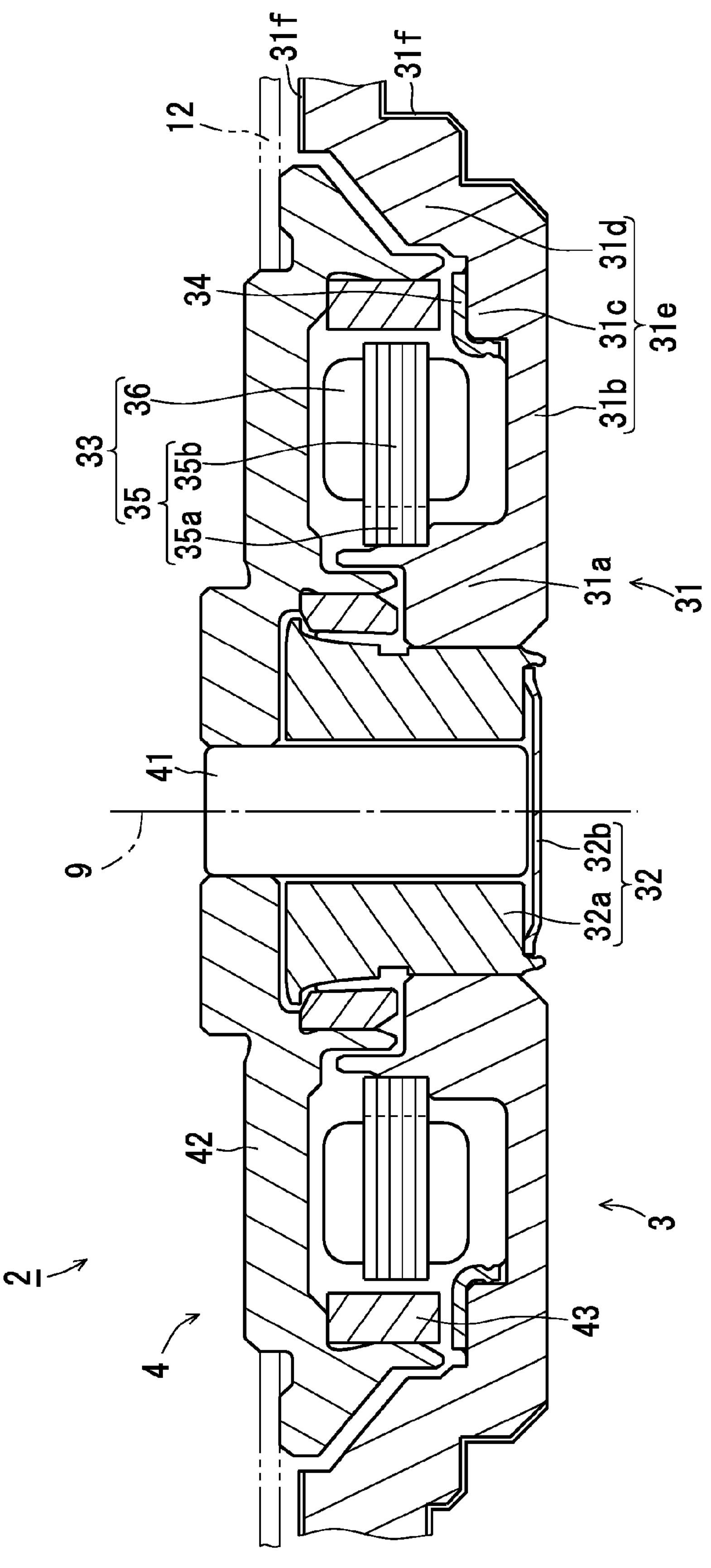
FIG. 3 is a vertical cross-sectional view of a spindle motor according to a preferred embodiment of the present invention.

Next, the structure of the spindle motor 2 will now be described below. FIG. 3 is a vertical cross-sectional view of the spindle motor 2. As illustrated in FIG. 3, the spindle motor 2 includes a stationary portion 3 and a rotating portion 4. The stationary portion 3 is fixed to the apparatus housing 11 of the disk drive apparatus 1. The rotating portion 4 is supported to be rotatable with respect to the stationary portion 3.

The stationary portion 3 preferably includes a base member 31, a stationary bearing unit 32, a stator unit 33, and a thrust yoke 34.

The base member 31 defines a portion of the apparatus housing 11 of the disk drive apparatus 1, and the base member 31 and a remaining portion of the apparatus housing 11 are together defined by a single member. The apparatus housing 11, including the base member 31, is produced, for example, by making an aluminum casting and subjecting this casting to a cutting process. In addition, a large area in a surface of the apparatus housing 11 is coated with an electrodeposition coating layer 31*f* to prevent dust from gathering. The base member 31 preferably includes a cylindrical portion 31*a*, a bottom portion 31*b*, a yoke receiving portion 31*c*, and an outside portion 31*d*.

The cylindrical portion 31*a* includes a portion projecting upward from a radially inner edge portion of the bottom portion 31*b*. Hereinafter, the terms "radially", "radial", and "radial direction" refer to directions perpendicular or substantially perpendicular to the central axis. The bottom portion 31*b* includes a substantially disc-shaped portion extending radially outward from a lower end portion of the cylindrical portion 31*a*. The yoke receiving portion 31*c* includes a portion arranged radially outward of the bottom portion 31*b* and to which the thrust yoke 34 is fixed. The outside portion 31*d* includes a portion arranged radially outward of the yoke receiving portion 31*c* and extending upward and radially outward therefrom.

The bottom portion 31*b*, the yoke receiving portion 31*c*, and the outside portion 31*d* of the base member 31 preferably together define an accommodating portion 31*e* which is substantially in the shape of a cup opening upward. The stationary bearing unit 32, the stator unit 33, the thrust yoke 34, and the rotating portion 4 are placed inside the accommodating portion 31*e*.

Note that the base member 31 and the apparatus housing 11 may be defined by separate members if so desired.

The stationary bearing unit 32 is a mechanism to rotatably support a shaft 41 provided in the rotating portion 4. The stationary bearing unit 32 is fixed to an inside surface of the cylindrical portion 31*a* of the base member 31. The stationary bearing unit 32 preferably includes a substantially cylindrical sleeve 32*a* and a cap 32*b* arranged to close a lower opening of the sleeve 32*a*. A clearance space between an inner circumferential surface of the sleeve 32*a* and an outer circumferential surface of the shaft 41 is filled with lubricating oil.

The stator unit 33 preferably includes a stator core 35 and a plurality of coils 36. The stator unit 33 is designed to generate magnetic flux in accordance with drive currents supplied to the coils 36.

The stator core 35 preferably includes an annular core back 35*a* and a plurality of tooth portions 35*b* arranged to project radially outward from the core back 35*a*. The core back 35*a* is fixed to an outer circumferential surface of the cylindrical portion 31*a* of the base member 31. The stator core 35 is produced, for example, by subjecting an electromagnetic steel sheet to a stamping process to obtain a plurality of electromagnetic steel sheet stampings in the aforementioned shape, and placing the stampings one upon another in an axial direction.

Each coil 36 is preferably defined by a lead wire wound around a separate one of the tooth portions 35*b* of the stator core 35. The coils 36 are positioned above the bottom portion 31*b* of the base member 31.

The thrust yoke 34 is arranged below a rotor magnet 43 described below, and fixed to the yoke receiving portion 31*c* of the base member 31. The thrust yoke 34 is made of a magnetic substance, examples of which include an electromagnetic steel sheet (e.g., a silicon steel sheet, etc.), ferromagnetic stainless steel (e.g., SUS430, etc.), and a cold-rolled steel sheet (e.g., SPCC, SPCE, etc.). The thrust yoke 34 corresponds to a magnetic member. The thrust yoke 34 is arranged to attract the rotating portion 4 toward the stationary portion 3 by magnetic attraction generated between the thrust yoke 34 and the rotor magnet 43 to stabilize the posture of the rotating portion 4 during rotation.

The rotating portion 4 preferably includes the shaft 41, a hub 42, and the rotor magnet 43.

The shaft 41 is substantially in the shape of a column, and is arranged to extend in the vertical direction along the central axis 9. The shaft 41 is inserted inside the sleeve 32*a*, and supported to be rotatable with respect to the stationary bearing unit 32. The hub 42 is fixed to the shaft 41, and arranged to rotate together with the shaft 41. The hub 42 includes a support surface to support the disk 12. Note that the hub 42 and the shaft 41 may be defined by a single member if so desired.

The rotor magnet 43 is fixed to the hub 42. The rotor magnet 43 is annular in shape and centered on the central axis 9. That is, the rotor magnet 43 is arranged around the central axis 9. An inner circumferential surface of the rotor magnet 43 is arranged radially opposite the tooth portions 35*b* and the coils 36 with a gap therebetween. In addition, the inner circumferential surface of the rotor magnet 43 defines a pole surface on which north and south poles alternate with each other.

When the drive currents are supplied to the coils 36 of the stator unit 33 of the spindle motor 2, radial magnetic flux is generated about the tooth portions 35*b* of the stator core 35. As a result, interaction between the magnetic flux about the tooth portions 35*b* and magnetic flux from the rotor magnet 43 produces a circumferential torque to cause the rotating portion 4 to rotate about the central axis 9 with respect to the stationary portion 3. The disk 12 supported by the hub 42 rotates about the central axis 9 together with the shaft 41 and the hub 42.

Figure 4:
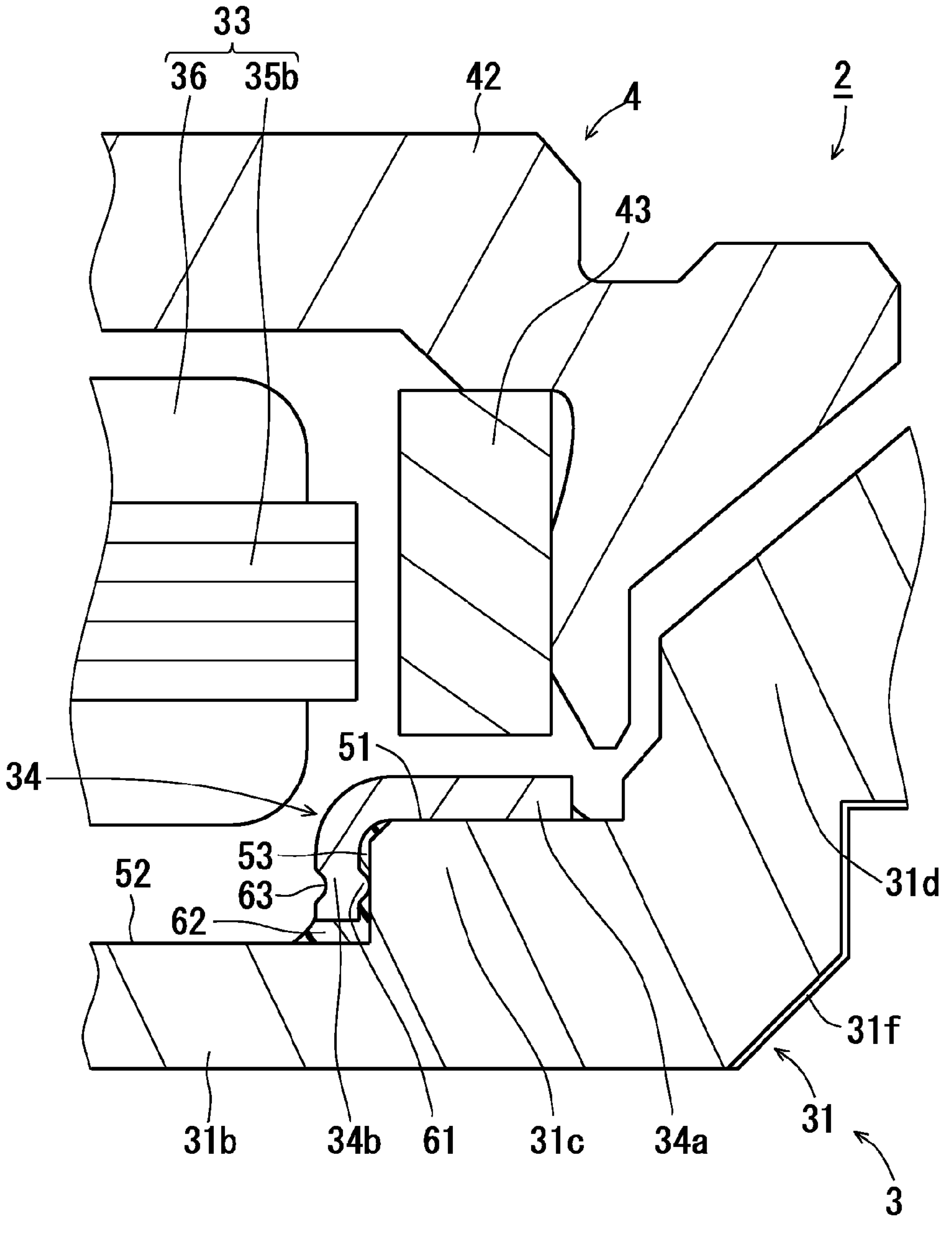
FIG. 4 is a partial vertical cross-sectional view of the spindle motor.
Figure 5:
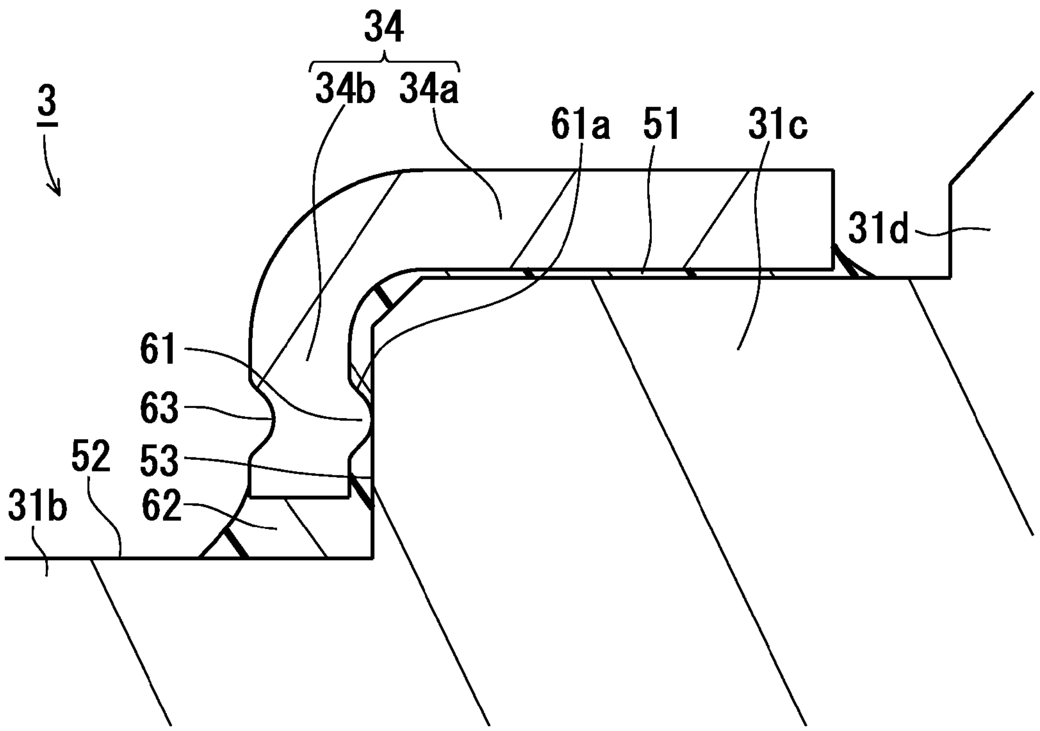
FIG. 5 is a partial vertical cross-sectional view of a stationary portion according to a preferred embodiment of the present invention.
Figure 6:
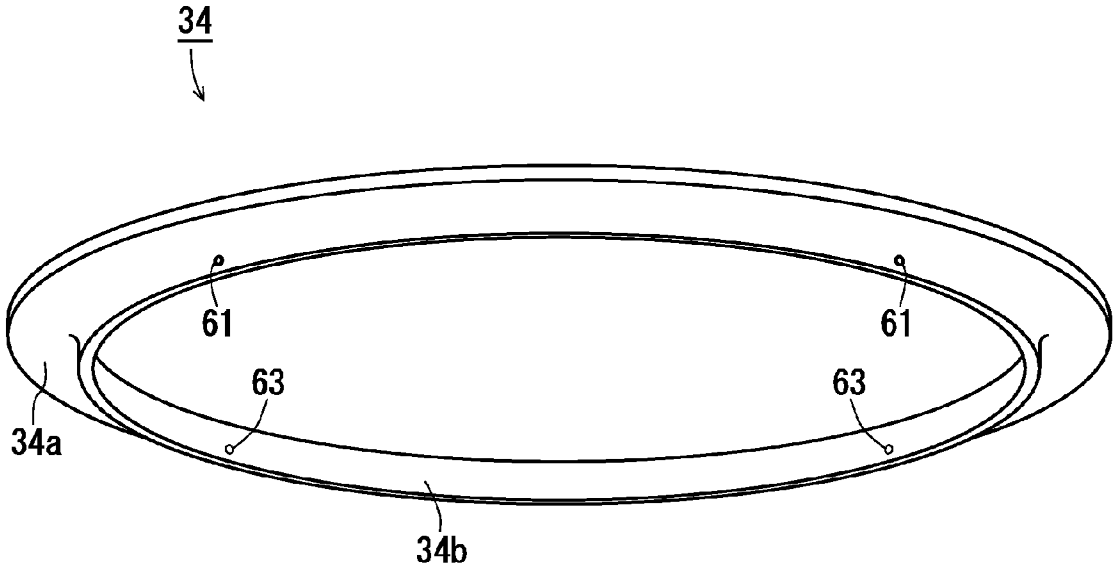
FIGS. 6 and 7 are each a perspective view of a thrust yoke according to a preferred embodiment of the present invention.

Next, the fixing of the thrust yoke 34 to the base member 31 will now be described in more detail below. FIG. 4 is a partial vertical cross-sectional view of the spindle motor 2, in which the thrust yoke 34 is shown. FIG. 5 is a partial vertical cross-sectional view of the stationary portion 3, illustrating the thrust yoke 34 and its vicinities in more enlarged form. FIG. 6 is a perspective view of the thrust yoke 34.

As illustrated in FIGS. 4 and 5, an upper surface 51 of the yoke receiving portion 31*c* of the base member 31 preferably includes an annular flat surface spreading perpendicularly or substantially perpendicularly to the central axis 9. The upper surface 51 of the yoke receiving portion 31*c* is positioned at a level higher than that of an upper surface 52 of the bottom portion 31*b*. A cylindrical wall surface 53 is arranged to extend between the upper surface 52 of the bottom portion 31*b* and the upper surface 51 of the yoke receiving portion 31*c*. The wall surface 53 is arranged to extend downward from a radially inner edge portion of the upper surface 51 of the yoke receiving portion 31*c*.

As illustrated in FIGS. 4 to 6, the thrust yoke 34 includes a plate portion 34*a* and a projecting portion 34*b*. The plate portion 34*a* includes an annular portion arranged on the upper surface 51 of the yoke receiving portion 31*c* to extend perpendicularly or substantially perpendicularly to the central axis 9. An upper surface of the plate portion 34*a* is arranged axially opposite a lower surface of the rotor magnet 43 with a gap therebetween. The projecting portion 34*b* includes a substantially cylindrical portion extending downward from a radially inner edge portion of the plate portion 34*a*. An outer circumferential surface of the projecting portion 34*b* is arranged radially opposite the wall surface 53 of the base member 31.

The outer circumferential surface of the projecting portion 34*b* has a plurality of raised portions 61 arranged thereon. In the present preferred embodiment, the raised portions 61 are arranged at regular intervals in a circumferential direction. Each of the raised portions 61 is arranged to bulge radially outward from the radially outer circumferential surface of the projecting portion 34*b*. The projecting portion 34*b* of the thrust yoke 34 is press fitted to the base member 31 with the raised portions 61 in contact with the wall surface 53.

In order to obtain a high fixing strength as a result of the press fitting, it is preferable that a radial press-fit interference (allowance) for the press fitting of the thrust yoke 34 to the base member 31 be about 5 μm or more, for example. Moreover, the radial press-fit interference for the press fitting of the thrust yoke 34 to the base member 31 is preferably about 50 μm or less, more preferably about 35 μm or less, for example, to increase the ease of the press fitting.

Each raised portion 61 preferably includes a curved surface 61*a*. In the present preferred embodiment, as illustrated in FIG. 5, the surface 61*a* of each raised portion 61 is preferably in the shape of a smooth curve in a vertical cross-section. Therefore, it is possible to press fit the raised portions 61 to the wall surface 53 of the base member 31 with a small press-fit force during a production process.

In addition, an adhesive 62 is preferably arranged between the base member 31 and the thrust yoke 34. The adhesive 62 contributes to the strength with which the base member 31 and the thrust yoke 34 are fixed to each other. That is, the base member 31 and the thrust yoke 34 are fixed to each other by a combination of the press fitting and the adhesive 62, for example. Accordingly, the base member 31 and the thrust yoke 34 are fixed to each other more securely than when they are fixed to each other by only one of the press fitting and the adhesive 62.

The adhesive 62 may deteriorate with long-term use, due to influence of changes in ambient temperature and the like, resulting in a decrease in the fixing strength. In the present preferred embodiment, however, a portion of the fixing strength owing to the press fitting will be maintained even after the deterioration of the adhesive 62. This contributes to reducing the probability of the thrust yoke 34 coming off the base member 31 due to the magnetic attraction between the thrust yoke 34 and the rotor magnet 43 after the deterioration of the adhesive 62.

Moreover, in the present preferred embodiment, a fixing strength required for the fixing of the thrust yoke 34 to the base member 31 does not need to be accomplished by only the adhesive 62. This leads to an increased number of options for the choice of the adhesive 62. It makes it possible, for example, to choose an adhesive that takes a relatively long time to solidify as the adhesive 62, in order to facilitate an operation of application of the adhesive 62.

Moreover, in the present preferred embodiment, the projecting portion 34*b*, which is arranged to extend in the axial direction from the plate portion 34*a* of the thrust yoke 34, is press fitted to the wall surface 53 of the base member 31. Therefore, a stress applied from the wall surface 53 during the press fitting is unlikely to reach the plate portion 34*a* of the thrust yoke 34. This reduces the probability of a deformation of the plate portion 34*a*. Furthermore, in the spindle motor 2 according to the present preferred embodiment, the axial distance between the plate portion 34*a* and the rotor magnet 43 is unlikely to vary at different positions.

In the present preferred embodiment, it is preferable that, only the raised portions 61 be arranged in contact with the wall surface 53 within the outer circumferential surface of the projecting portion 34*b*. Because the raised portions 61 are arranged discontinuously in the circumferential direction, the press fitting of the projecting portion 34*b* to the wall surface 53 is easily achieved even when the dimensions of the projecting portion 34*b* or those of the wall surface 53 of the base member 31 are not highly precise. In particular, in the case where the thrust yoke 34 is produced by a press molding process, variations are more likely to occur in circularity of the projecting portion 34*b* than in the case where the thrust yoke 34 is produced by another method, such as a cutting process. In the present preferred embodiment, the press fitting of the projecting portion 34*b* to the wall surface 53 is easily achieved even when the projecting portion 34*b* has a low degree of circularity.

Furthermore, the stress applied from the wall surface 53 during the press fitting acts primarily on the raised portions 61 within the outer circumferential surface of the projecting portion 34*b*, so that the probability of a deformation of the projecting portion 34*b* as a whole is reduced. This leads to an additional reduction in the probability of a deformation of the plate portion 34*a*.

A concavity portion 63 is preferably defined in an inner circumferential surface of the projecting portion 34*b* at a position corresponding to each raised portion 61. It is possible to form the concavity portion 63 at a position opposite to each raised portion 61 at the same time when the raised portions 61 are formed by press working, for example. When the thrust yoke 34 is press fitted to the base member 31, an operator is able to recognize locations of the raised portions 61 by viewing the concavity portions 63. This facilitates the press fitting operation.

As illustrated in FIGS. 3 and 4, a surface of the outside portion 31*d* of the base member 31 is, except some portions thereof, coated with the electrodeposition coating layer 31*f*. The electrodeposition coating layer 31*f* contributes to preventing gathering of dust from a metal surface subjected to a cutting process.

Meanwhile, neither the wall surface 53 nor the upper surface 51 of the yoke receiving portion 31*c* is coated with the electrodeposition coating layer 31*f*. That is, both the wall surface 53 and the upper surface 51 of the yoke receiving portion 31*c* have their metal surfaces subjected to a cutting process left exposed. As these metal surfaces determine the radial and axial positions of the thrust yoke 34, the exposure of the metal surfaces contributes to increasing the precision of the relative position of the thrust yoke 34 with respect to the base member 31.

Note that the upper surface 51 of the yoke receiving portion 31*c* may have the entirety of its metal surface left exposed as illustrated in FIGS. 4 and 5, or may alternatively have its metal surface left exposed only at a portion thereof positioned below the plate portion 34*a* of the thrust yoke 34.

Next, various examples of a modifications of the first preferred embodiment will now be described below with a focus on differences from the above-described preferred embodiment.

Figure 7:
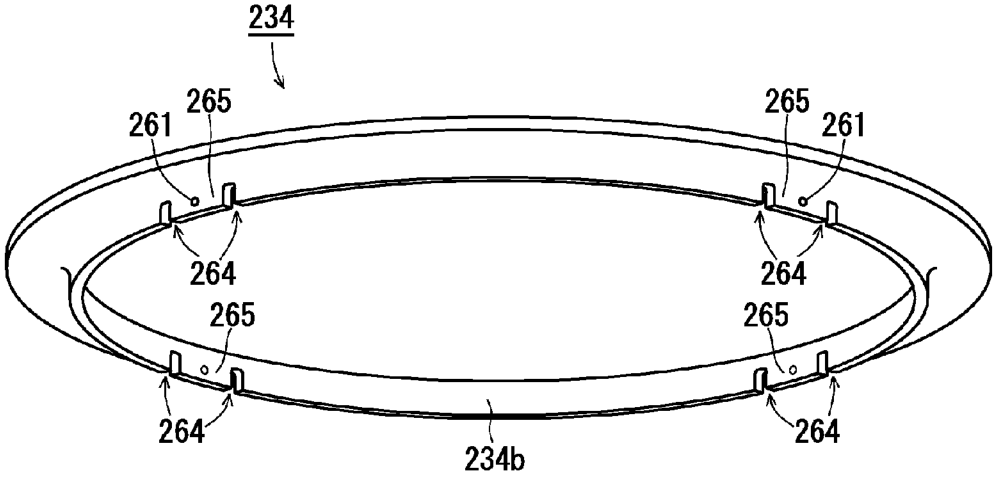

FIG. 7 is a perspective view of a thrust yoke 234 according to an example of a modification of the first preferred embodiment. In the example of a modification illustrated in FIG. 7, a plurality of notches 264 are defined in a projecting portion 234*b* of the thrust yoke 234. Each of the notches 264 is arranged to extend axially upward from a lower end portion of the projecting portion 234*b*, and extend throughout the projecting portion 234*b* in the radial direction.

In the example of a modification illustrated in FIG. 7, each pair of two of the notches 264 are arranged to have a raised portion 261 nearby therebetween. A portion of the projecting portion 234*b* which is positioned between the two notches 264 defining each pair has an increased flexibility as compared to when no notches 264 are provided. In other words, an elastic section 265 including one of the raised portions 261 is defined between the two notches 264 forming each pair.

When the thrust yoke 234 is press fitted to a base member, it is possible to cause each elastic section 265 to bend radially inward by bringing the raised portion 261 therein into contact with a wall surface of the base member. This contributes to preventing a deformation of the other portions of the thrust yoke 234 than the elastic sections 265. Moreover, the radially inward bending of the elastic sections 265 contributes to preventing the base member from being scraped with the raised portions 261 during the press fitting. Thus, it is possible to prevent dust from being generated from the base member 231 while ensuring a sufficient fixing strength by the press fitting.

Note that the notches 264 may preferably be arranged in pairs such that the two notches 264 forming each pair are arranged on either circumferential side of and close to a separate one of the raised portions 261, and that the notches 264 may alternatively be arranged such that each notch 264 is provided on one side of and close to a separate one of the raised portions 261. When at least one notch 264 is defined in the vicinity of each raised portion 261, portions of the projecting portion 234*b* which are in the vicinity of the notches 264 increase in flexibility. This contributes to preventing a deformation of the other portions of the thrust yoke 234 during the press fitting.

Figure 8:
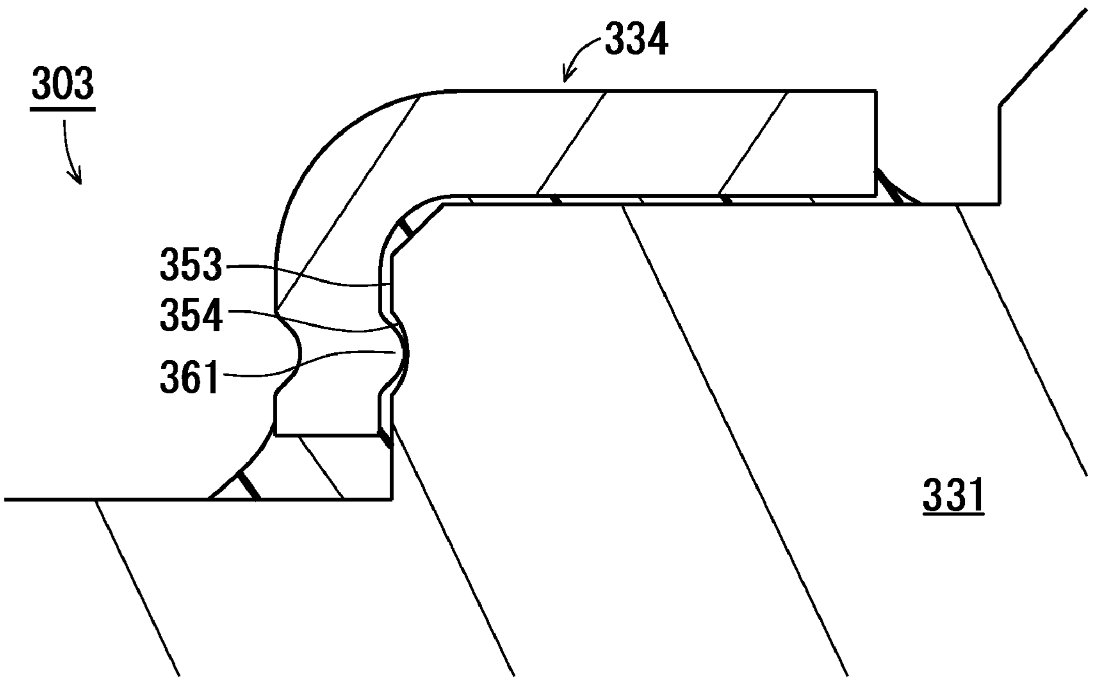
FIGS. 8, 9, and 10 are each a partial vertical cross-sectional view of a stationary portion according to a preferred embodiment of the present invention.

FIG. 8 is a partial vertical cross-sectional view of a stationary portion 303 according to another example of a modification of the first preferred embodiment. In the example of a modification illustrated in FIG. 8, a recessed portion(s) 354 is defined in a wall surface 353 of a base member 331, and raised portions 361 of a thrust yoke 334 are arranged in contact with the recessed portion(s) 354. The raised portions 361 are thus engaged with the recessed portion(s) 354, resulting in an increase in the strength with which the thrust yoke 334 is fixed to the base member 331.

Note that the recessed portion(s) 354 may be defined by an annular groove extending continuously around an entire circumference of the wall surface 353, or may alternatively be defined in the wall surface 353 only at positions corresponding to the raised portions 361. In the case where the recessed portion(s) 354 is defined by an annular groove extending continuously around the entire circumference of the wall surface 353, it is not necessary to adjust circumferential positions of the raised portions 361 when press fitting the thrust yoke 334 to the base member 331. This facilitates the operation of press fitting the thrust yoke 334 to the base member 331.

Figure 9:
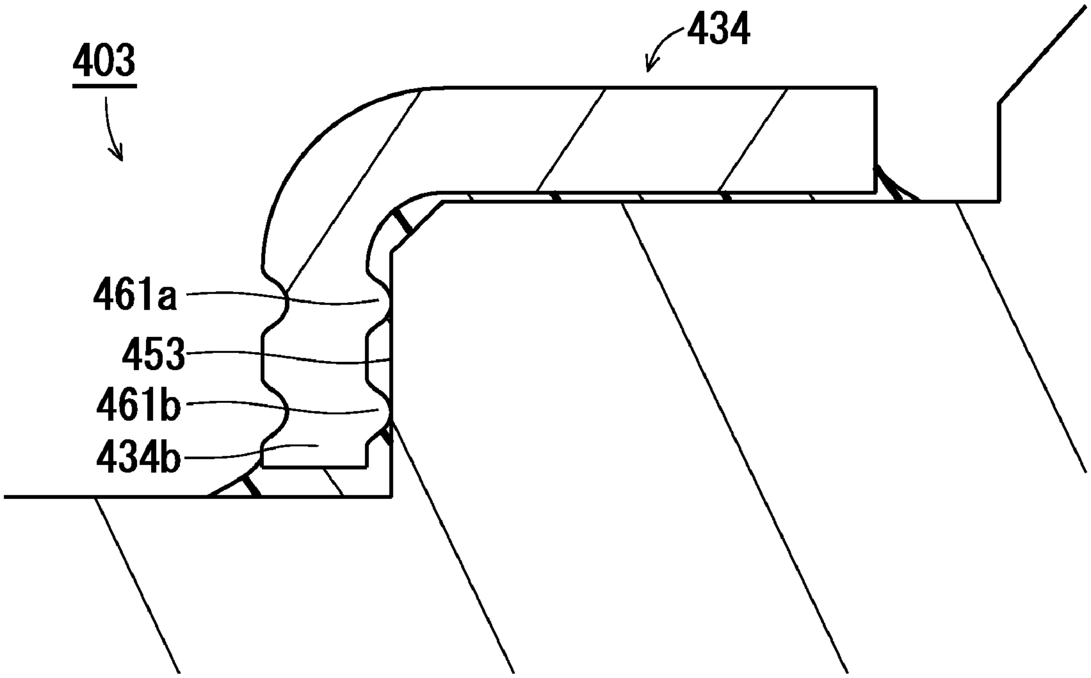

FIG. 9 is a partial vertical cross-sectional view of a stationary portion 403 according to yet another example of a modification of the first preferred embodiment. In the example of a modification illustrated in FIG. 9, first and second raised portions 461*a* and 461*b*, one spaced from the other in the axial direction, are defined in a projecting portion 434*b* of a thrust yoke 434. That is, in the example of a modification illustrated in FIG. 9, the thrust yoke 434 includes the first and second raised portions 461*a* and 461*b*, and the first and second raised portions 461*a* and 461*b* are arranged at different axial positions. This arrangement contributes to increasing the strength with which the projecting portion 434*b* is fixed to a wall surface 453.

Note that the first and second raised portions 461*a* and 461*b* may be arranged at the same circumferential position as illustrated in FIG. 9, or may alternatively be arranged at different circumferential positions.

Figure 10:
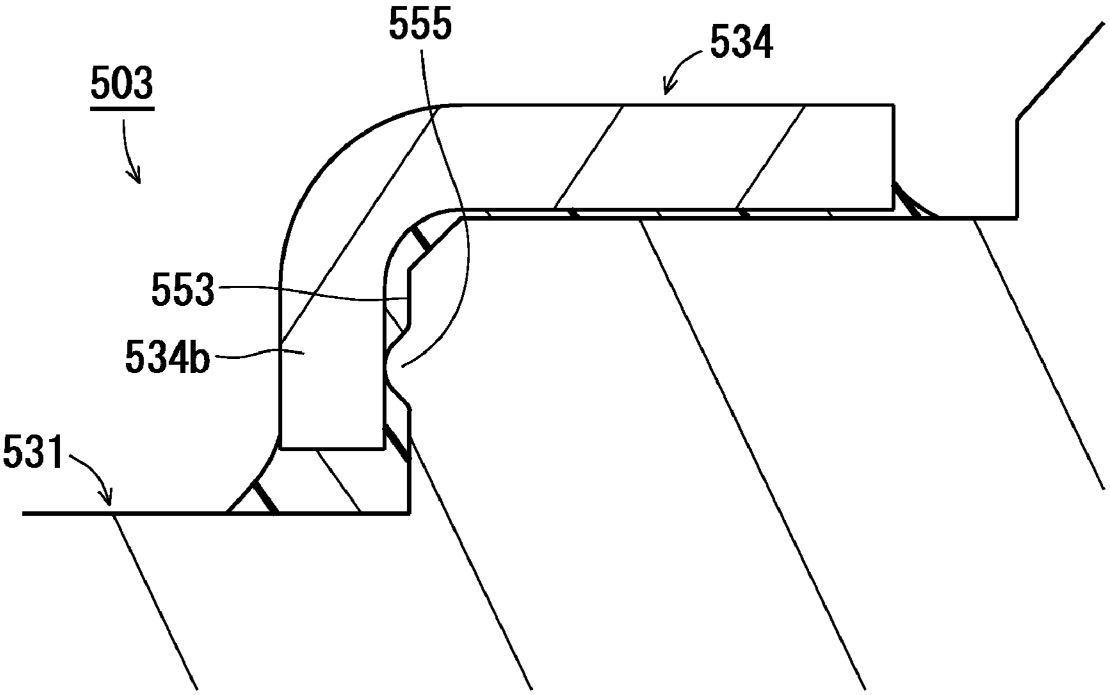

FIG. 10 is a partial vertical cross-sectional view of a stationary portion 503 according to yet another example of a modification of the first preferred embodiment. In the example of a modification illustrated in FIG. 10, a raised portion 555 is defined in a wall surface 553 of a base member 531. In addition, a projecting portion 534*b* of a thrust yoke 534 is press fitted to the wall surface 553 with the raised portion 555 arranged in contact with an outer circumferential surface of the projecting portion 534*b*.

Figure 11:
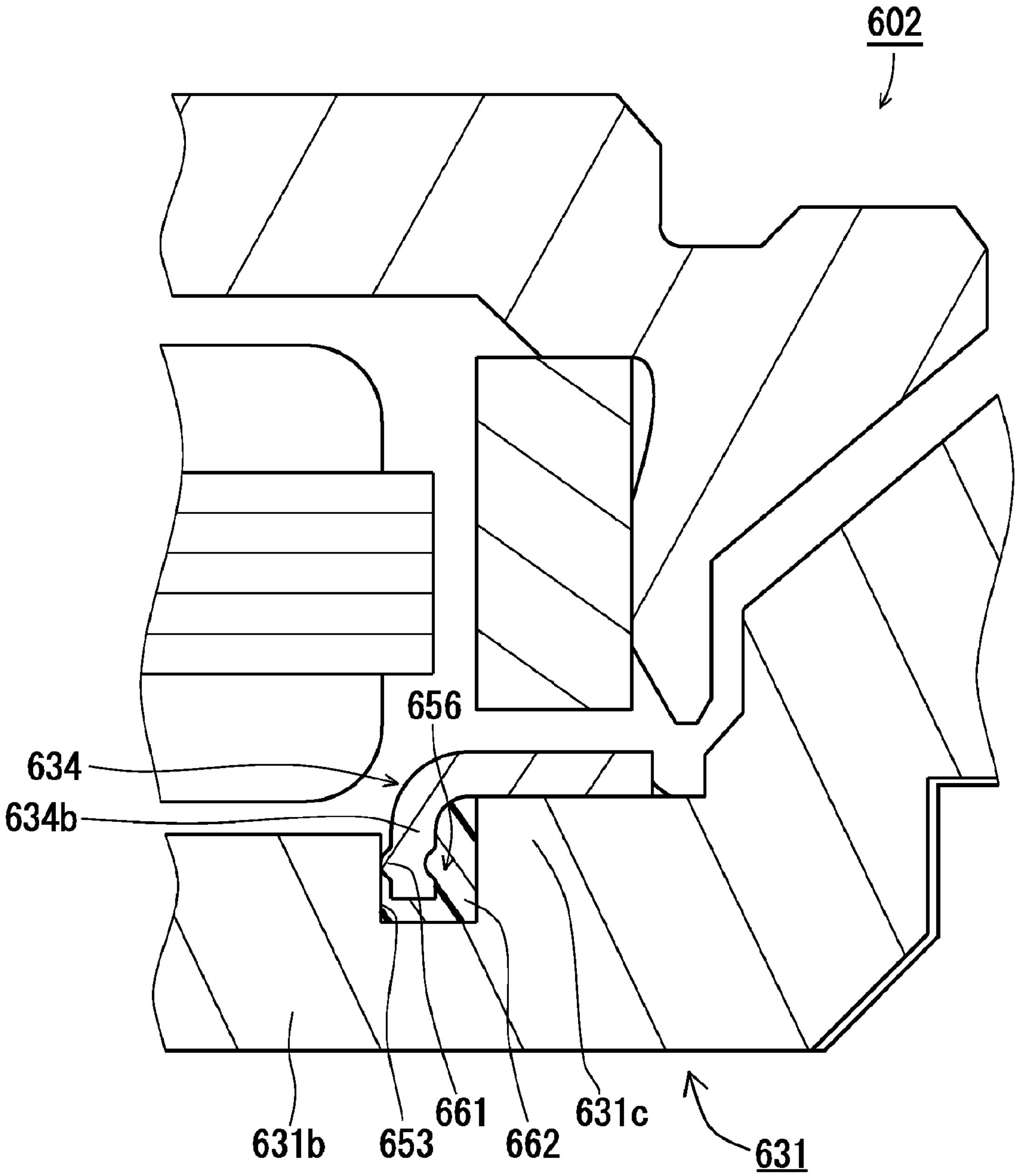
FIGS. 11 and 12 are each a partial vertical cross-sectional view of a spindle motor according to a preferred embodiment of the present invention.

FIG. 11 is a partial vertical cross-sectional view of a spindle motor 602 according to yet another example of a modification of the first preferred embodiment. In the example of a modification illustrated in FIG. 11, a groove 656 is defined between a bottom portion 631*b* and a yoke receiving portion 631*c* of abase member 631. A radially inner end surface of the groove 656 defines a wall surface 653 extending in the axial direction. Moreover, in the example of a modification illustrated in FIG. 11, a plurality of raised portions 661 are defined in an inner circumferential surface of a projecting portion 634*b* of a thrust yoke 634. The projecting portion 634*b* of the thrust yoke 634 is press fitted to the base member 631 with the raised portions 661 arranged in contact with the wall surface 653.

In the example of a modification illustrated in FIG. 11, an adhesive 662 can be held within the groove 656 of the base member 631 to achieve an increase in the fixing strength by the adhesive 662.

Figure 12:
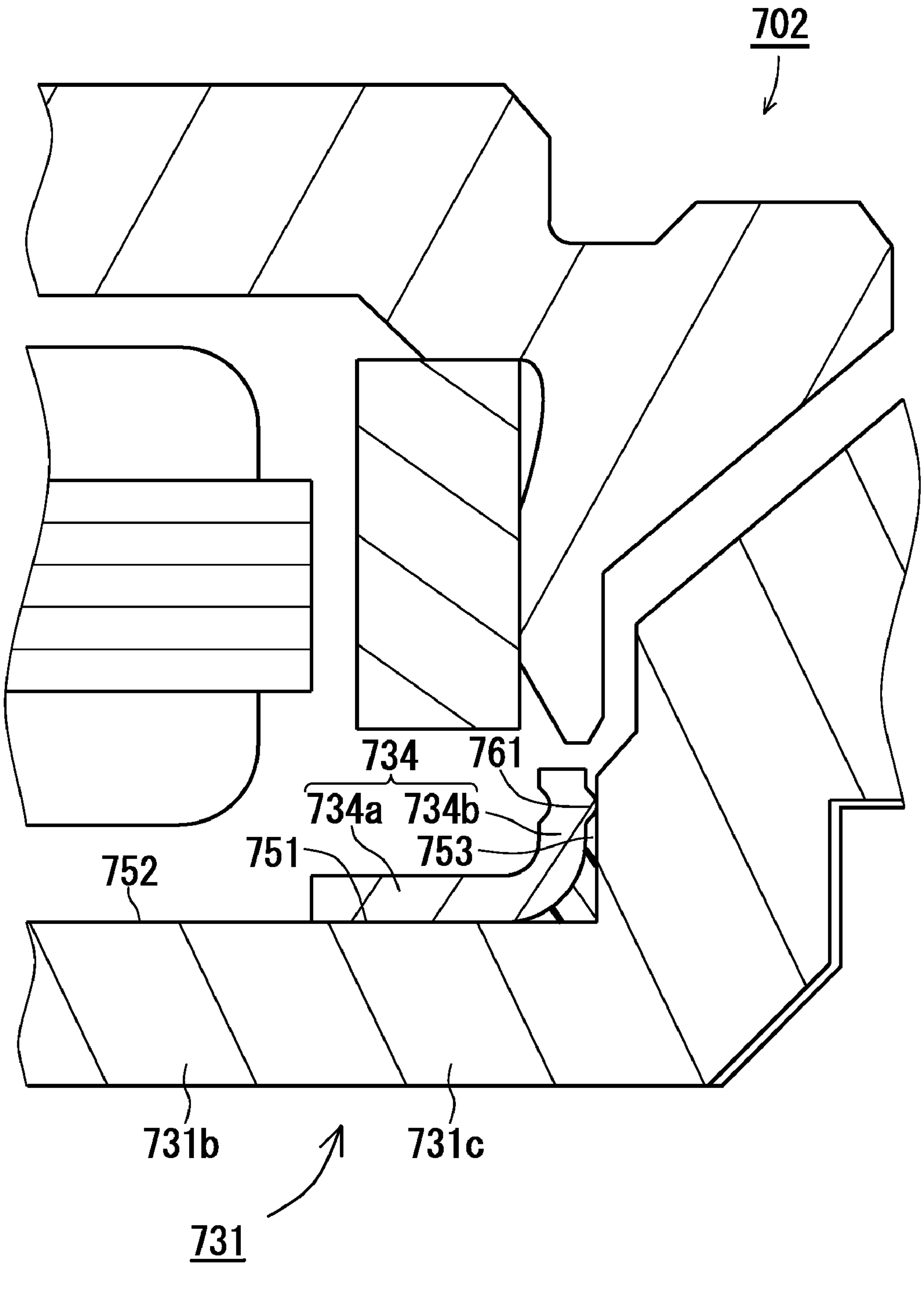

FIG. 12 is a partial vertical cross-sectional view of a spindle motor 702 according to yet another example of a modification of the first preferred embodiment. In the example of a modification illustrated in FIG. 12, an upper surface 752 of a bottom portion 731*b* and an upper surface 751 of a yoke receiving portion 731*c* together define a continuous flat surface. A wall surface 753 is arranged to extend upward from a radially outer edge portion of the yoke receiving portion 731*c*. In the example of a modification illustrated in FIG. 12, a projecting portion 734*b* of a thrust yoke 734 is arranged to extend upward from a radially outer edge portion of a plate portion 734*a* of the thrust yoke 734. A plurality of raised portions 761 are defined in an outer circumferential surface of the projecting portion 734*b*. The projecting portion 734*b* of the thrust yoke 734 is press fitted to a base member 731 with the raised portions 761 arranged in contact with the wall surface 753.

As is apparent from the foregoing description, the projecting portion of the thrust yoke may be arranged to extend either axially upward or axially downward from the plate portion. Note, however, that when the projecting portion is arranged to extend axially downward from the plate portion, a greater degree of flexibility is obtained in the arrangement of other members above the thrust yoke and in the design of the dimensions of such other members. For example, it is made easy to arrange the rotor magnet of the rotating portion close to the plate portion of the thrust yoke.

Note that the raised portions may be arranged only partially around the circumference as in the above-described first preferred embodiment, and that the raised portions may alternatively be substituted with an annular raised portion arranged to extend continuously around the entire circumference. Furthermore, the projecting portion of the thrust yoke may be in the shape of a cylinder as in the above-described first preferred embodiment, or may alternatively be substituted with one or more axial projections provided at one or more circumferential positions. Furthermore, the wall surface of the base member may be a cylindrical surface as in the above-described first preferred embodiment, or may alternatively be substituted with one or more surfaces provided at one or more circumferential positions.

Note that the thrust yoke may be fixed to the base member only through the press fitting, without use of an adhesive.

Also note that, without the projecting portion having any raised portion, the outer circumferential surface or the inner circumferential surface of the projecting portion may be press fitted to the wall surface at the entire circumference. That is, it is enough that at least a portion of the projecting portion be press fitted to the wall surface.

Next, a second preferred embodiment of the present invention will now be described below. The structure of a disk drive apparatus according to the second preferred embodiment is similar to that of the disk drive apparatus 1 according to the first preferred embodiment, and redundant descriptions will therefore be omitted.

Figure 13:
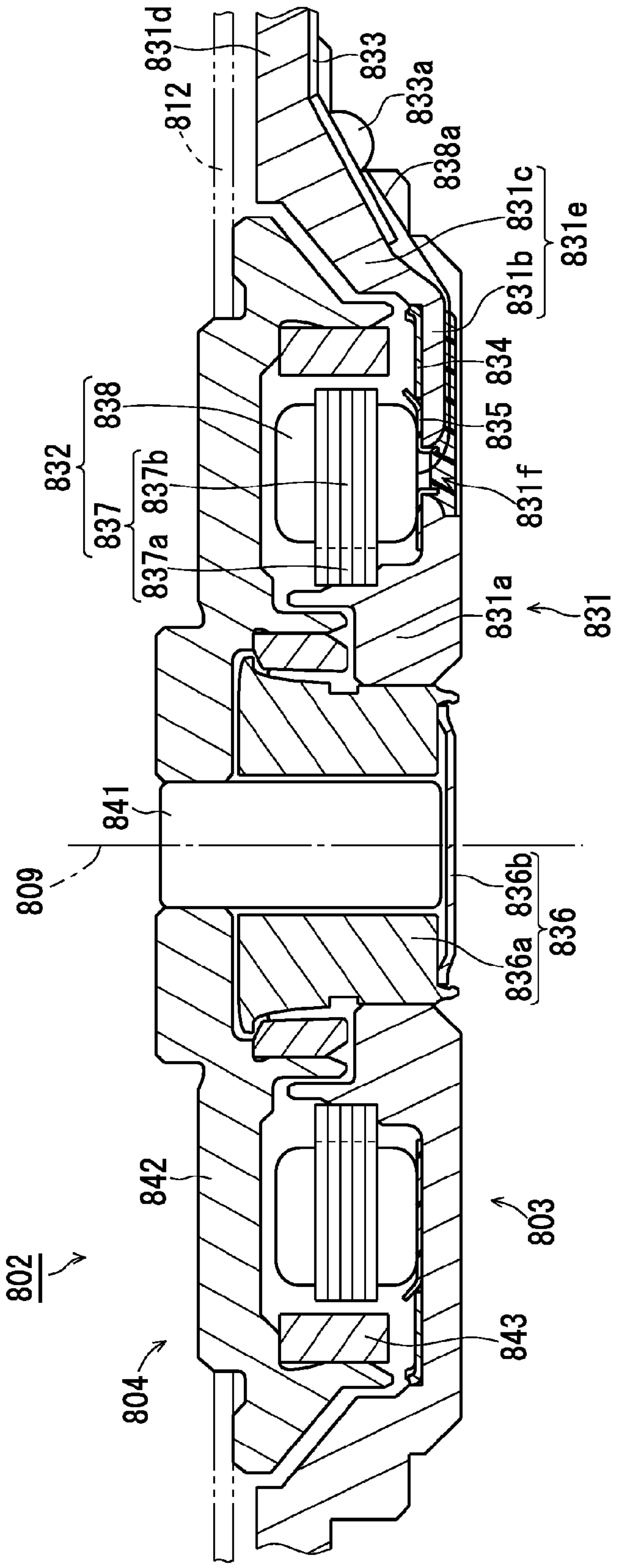
FIG. 13 is a vertical cross-sectional view of a spindle motor according to a preferred embodiment of the present invention.

FIG. 13 is a vertical cross-sectional view of a spindle motor 802 according to the second preferred embodiment. As illustrated in FIG. 13, the spindle motor 802 includes a stationary portion 803 fixed to the apparatus housing of the disk drive apparatus, and a rotating portion 804 arranged to rotate about a central axis 809 while supporting a disk 812.

The stationary portion 803 preferably includes a base member 831, a stator unit 832, a circuit board 833, a thrust yoke 834, an insulation sheet 835, and a stationary bearing unit 836.

The base member 831 defines a portion of the apparatus housing of the disk drive apparatus, and the base member 831 and a remaining portion of the apparatus housing are together defined by a single member. The base member 831 preferably includes a cylindrical portion 831*a*, a bottom portion 831*b*, a wall portion 831*c*, and an outer plate portion 831*d*. The cylindrical portion 831*a* preferably includes a portion projecting upward from an inner edge portion of the bottom portion 831*b*. The bottom portion 831*b* preferably includes a substantially disc-shaped portion extending radially outward from a lower end portion of the cylindrical portion 831*a*. The wall portion 831*c* preferably includes a portion extending radially outward and obliquely upward from an outer edge portion of the bottom portion 831*b*. The outer plate portion 831*d* preferably includes a portion extending radially outward from an outer edge portion of the wall portion 831*c*.

The bottom portion 831*b* and the wall portion 831*c* of the base member 831 together define an accommodating portion 831*e* which is substantially in the shape of a cup opening upward. The stator unit 832, the thrust yoke 834, the insulation sheet 835, and a rotor magnet 843 described below are placed inside the accommodating portion 831*e*. Meanwhile, the circuit board 833 is arranged radially outside the accommodating portion 831*e*. In the spindle motor 802, the stator unit 832 and the circuit board 833 are preferably arranged so as not to overlap with each other in the axial direction, and arranged at substantially similar levels. This contributes to reducing the axial thickness of the spindle motor 802 as a whole.

Note that the base member 831 may be defined by a portion of the apparatus housing as in the present preferred embodiment, but may alternatively be defined by a member separate from the apparatus housing.

The stator unit 832 includes a stator core 837 and a plurality of coils 838. The stator unit 832 is designed to generate magnetic flux in accordance with drive currents supplied to the coils 838. The stator core 837 includes an annular core back 837*a* and a plurality of tooth portions 837*b* arranged to project radially outward from the core back 837*a*. The core back 837*a* is fixed to an outer circumferential surface of the cylindrical portion 831*a* of the base member 831. The stator core 837 is produced, for example, by subjecting an electromagnetic steel sheet to a stamping process to obtain a plurality of electromagnetic steel sheet stampings in the aforementioned shape, and placing the stampings one upon another in the axial direction.

Each of the coils 838 is preferably defined by a lead wire wound around a separate one of the tooth portions 837*b* of the stator core 837. The coils 838 are positioned above the bottom portion 831*b* of the base member 831. The coils 838 according to the present preferred embodiment are defined by three lead wires 838*a* each arranged to supply an individual phase of a three-phase alternating current. An input-side end portion of each of the three lead wires 838*a* is drawn through a through hole 831*f* defined in the bottom portion 831*b* to extend along a lower surface of the bottom portion 831*b*.

The circuit board 833 is preferably a board on which an electronic circuit designed to supply the drive currents to the coils 838 is mounted. The circuit board 833 according to the present preferred embodiment is defined by a flexible printed circuit (FPC) board, which is capable of bending. The circuit board 833 is preferably fixed to an outside surface of the wall portion 831*c* and a lower surface of the outer plate portion 831*d* of the base member 831 through, for example, an adhesive or other fixing method. A solder portion 833*a* is arranged on a portion of the circuit board 833 which is fixed to the wall portion 831*c*. The input-side end portions of the lead wires 838*a* drawn from the coils 838 are connected to the solder portion 833*a*.

The thrust yoke 834 is press fitted to an inside surface of the wall portion 831*c* of the base member 831, and also fixed to an upper surface of the bottom portion 831*b* through an adhesive. An upper surface of the thrust yoke 834 is arranged axially opposite a lower surface of the rotor magnet 843 described below with a gap therebetween. That is, the thrust yoke 834 is arranged below the rotor magnet 843. The thrust yoke 834 is made of a magnetic substance, examples of which include an electromagnetic steel sheet (e.g., a silicon steel sheet, etc.), ferromagnetic stainless steel (e.g., SUS430, etc.), and a cold-rolled steel sheet (e.g., SPCC, SPCE, etc.). The thrust yoke 834 is arranged to correspond to the magnetic member. The thrust yoke 834 is preferably made of a soft magnetic material. The thrust yoke 834 is arranged to attract the rotating portion 804 toward the stationary portion 803 by magnetic attraction generated between the thrust yoke 834 and the rotor magnet 843 to stabilize the posture of the rotating portion 804 during rotation.

The insulation sheet 835 is a sheet having an insulating property, and is arranged between the bottom portion 831*b* of the base member 831 and the coils 838. A polyethylene terephthalate (PET) film or the like, for example, is used as the insulation sheet 835. The insulation sheet 835 is arranged to prevent an undesirable electrical connection between the coils 838 and the bottom portion 831*b* of the base member 831. The intervention of the insulation sheet 835 therebetween enables the coils 838 and the bottom portion 831*b* of the base member 831 to be arranged close to each other in the axial direction. This contributes to a further reduction in the total axial thickness of the spindle motor 802.

The stationary bearing unit 836 is a mechanism to rotatably support a shaft 841 provided in the rotating portion 804. The stationary bearing unit 836 is fixed to an inside surface of the cylindrical portion 831*a* of the base member 831. The stationary bearing unit 836 preferably includes a substantially cylindrical sleeve 836*a* and a cap 836*b* arranged to close a lower opening of the sleeve 836*a*. A clearance space between an inner circumferential surface of the sleeve 836*a* and an outer circumferential surface of the shaft 841 is filled with lubricating oil.

The rotating portion 804 preferably includes the shaft 841, a hub 842, and the rotor magnet 843.

The shaft 841 is provided substantially in the shape of a column, and is arranged to extend in the vertical direction along the central axis 809. The shaft 841 is inserted inside the sleeve 836*a*, and supported to be rotatable with respect to the stationary bearing unit 836. The hub 842 is fixed to the shaft 841, and arranged to rotate together with the shaft 841. The hub 842 includes a support surface arranged to support the disk 812. Note that the hub 842 and the shaft 841 may be defined by a single member if so desired.

The rotor magnet 843 is fixed to the hub 842. The rotor magnet 843 is annular in shape and centered on the central axis 809. That is, the rotor magnet 843 is arranged around the central axis 809. An inner circumferential surface of the rotor magnet 843 is arranged radially opposite the tooth portions 837*b* and the coils 838 with a gap therebetween. In addition, the inner circumferential surface of the rotor magnet 843 defines a pole surface on which north and south poles alternate with each other.

When the three-phase drive currents are supplied to the coils 838 of the spindle motor 802 through the circuit board 833, radial magnetic flux is generated about the tooth portions 837*b* of the stator core 837. As a result, an interaction between the magnetic flux about the tooth portions 837*b* and magnetic flux from the rotor magnet 843 produces a circumferential torque which causes the rotating portion 804 to rotate about the central axis 809 with respect to the stationary portion 803. The disk 812 supported by the hub 842 rotates about the central axis 809 together with the shaft 841 and the hub 842.

Figure 14:
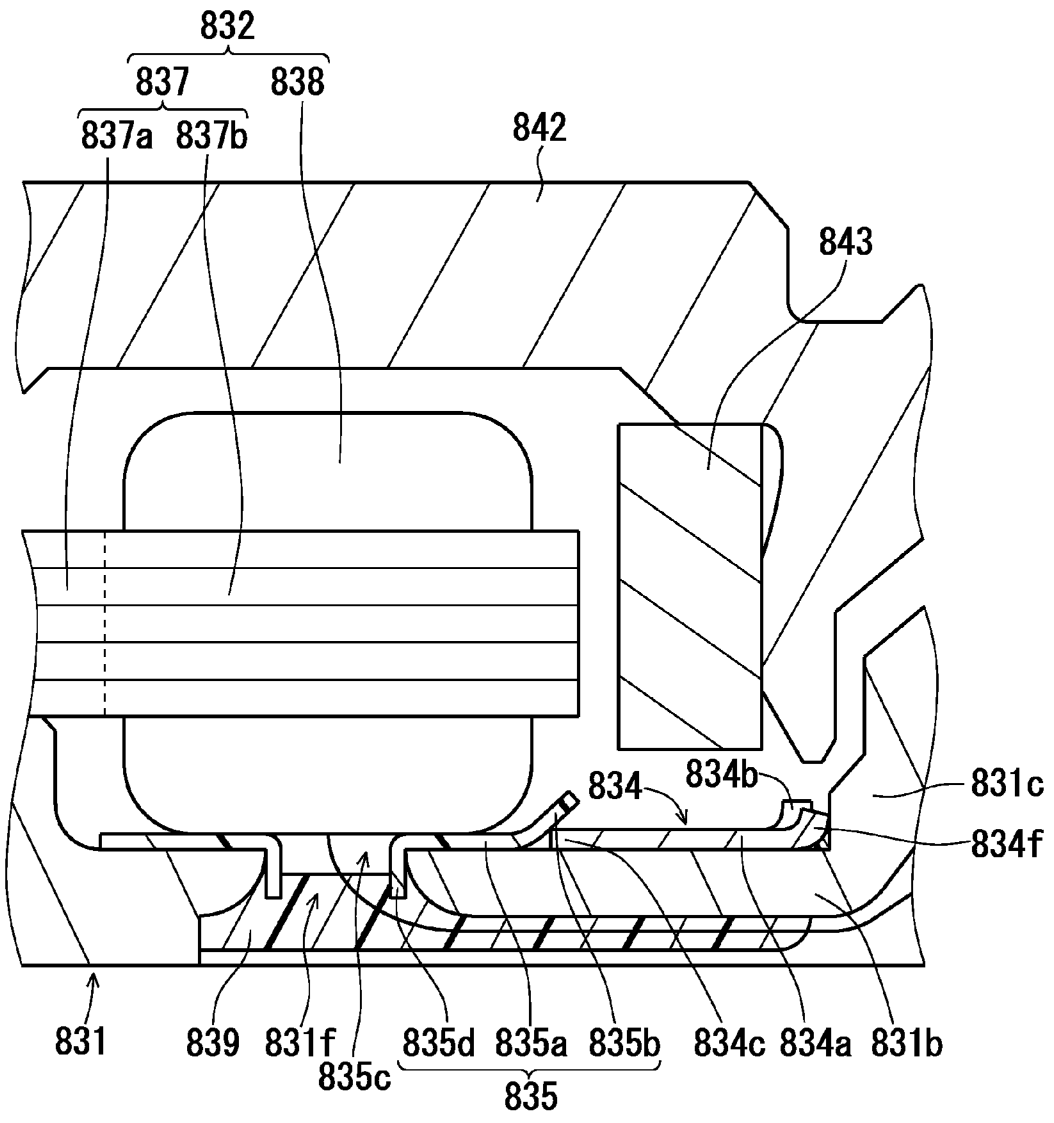
FIG. 14 is a partial vertical cross-sectional view of the spindle motor.

Next, the structures of the thrust yoke 834 and the insulation sheet 835 according to the present preferred embodiment will now be described in more detail below. FIG. 14 is a partial vertical cross-sectional view of the spindle motor 802, illustrating the thrust yoke 834 and the insulation sheet 835 among other components.

As illustrated in FIG. 14, the thrust yoke 834 preferably includes a plate portion 834*a* and a projecting portion 834*b*. The plate portion 834*a* preferably includes an annular portion fixed to the upper surface of the bottom portion 831*b* of the base member 831. The projecting portion 834*b* includes a portion extending upward from an outer edge portion of the plate portion 834*a*. The thrust yoke 834 has a high degree of rigidity at and near an outer edge portion thereof due to the projecting portion 834*b*.

The plate portion 834*a* is provided substantially in the shape of a sheet with a small axial dimension. Accordingly, a space required inside the accommodating portion 831*e* of the base member 831 to accommodate the thrust yoke 834 only needs to have a small axial dimension. This contributes to further reduction of the total axial thickness of the spindle motor 802.

The insulation sheet 835 preferably includes a sheet body portion 835*a* and a cover portion 835*b*. The sheet body portion 835*a* includes an annular portion placed on the upper surface of the bottom portion 831*b* of the base member 831. The sheet body portion 835*a* is arranged radially inward of the thrust yoke 834 and axially between the bottom portion 831*b* and the coils 838. The cover portion 835*b* is positioned radially outward of the sheet body portion 835*a*, and spaced from the bottom portion 831*b* of the base member 831.

The cover portion 835*b* is arranged to extend from an outer edge portion of the sheet body portion 835*a* to a space above a radially inner edge portion 834*c* of the thrust yoke 834. That is, a portion of the cover portion 835*b* is arranged to cover an upper surface of the edge portion 834*c* of the thrust yoke 834. In addition, in the present preferred embodiment, the cover portion 835*b* is arranged in contact with the edge portion 834*c* of the thrust yoke 834. The edge portion 834*c* is accordingly held between the bottom portion 831*b* of the base member 831 and the cover portion 835*b* of the insulation sheet 835.

While magnetic attraction between the thrust yoke 834 and the rotor magnet 843 induces an upward displacement of the edge portion 834*c* of the thrust yoke 834, the cover portion 835*b* provides a downward reaction to the edge portion 834*c*. This downward reaction contributes to preventing the upward displacement of the edge portion 834*c* of the thrust yoke 834.

Because the plate portion 834*a* of the thrust yoke 834 is in the shape of a sheet with a small axial dimension, the plate portion 834*a* of the thrust yoke 834 is especially subject to partial bending. Therefore, if the cover portion 835*b* were not provided and the adhesive were not arranged to spread up to a lower surface of the edge portion 834*c* of the thrust yoke 834, the edge portion 834*c* of the thrust yoke 834 might be easily displaced upward. In the present preferred embodiment, the cover portion 835*b* of the insulation sheet 835 contributes to preventing such an upward displacement of the edge portion 834*c* of the thrust yoke 834. That is, the spindle motor 802 achieves a reduction in the axial thickness thereof with the use of the thrust yoke 834 in the shape of a sheet therein, while at the same time the upward displacement of the edge portion 834*c* of the thrust yoke 834 is sufficiently prevented.

Moreover, in the present preferred embodiment, it is not necessary to provide an additional component separate from the insulation sheet 835 to prevent the upward displacement of the thrust yoke 834. An increase in the number of components of the spindle motor 802 is thus avoided. This contributes to further reducing the axial thickness of the spindle motor 802.

The sheet body portion 835*a* of the insulation sheet 835 is arranged between the coils 838 and the bottom portion 831*b* of the base member 831. Preferably, a lower surface of the sheet body portion 835*a* is arranged in contact with the upper surface of the bottom portion 831*b* of the base member 831, while an upper surface of the sheet body portion 835*a* is arranged in contact with the coils 838. This arrangement contributes to preventing an upward displacement of the insulation sheet 835. This in turn contributes to further preventing the upward displacement of the edge portion 834*c* of the thrust yoke 834. Furthermore, the bottom portion 831*b* of the base member 831, the insulation sheet 835, and the coils 838 are arranged compactly in the axial direction. This contributes to further reducing the axial thickness of the spindle motor 802.

The through hole 831*f*, which extends in the axial direction, is defined in the bottom portion 831*b* of the base member 831. The through hole 831*f* is positioned below the coils 838. The insulation sheet 835 has defined therein an opening portion 835*c* in communication with the through hole 831*f*. Moreover, the insulation sheet 835 includes a sheet tubular portion 835*d*, which is cylindrical in shape and arranged to extend downward from a periphery of the opening portion 835*c*. The sheet tubular portion 835*d* is positioned within the through hole 831*f* of the base member 831.

The through hole 831*f* is sealed with an adhesive 839, so that an interior space of the apparatus housing is isolated from an exterior space. The adhesive 839 is arranged also to fix the sheet tubular portion 835*d* of the insulation sheet 835 to the base member 831. The fixing of the insulation sheet 835 to the base member 831 contributes to preventing the upward displacement of the insulation sheet 835. This in turn contributes to further preventing the upward displacement of the edge portion 834*c* of the thrust yoke 834.

The insulation sheet 835 is fixed to the base member 831 through the adhesive 839 held within the through hole 831*f*. In the present preferred embodiment, the adhesive 839 does not intrude between the upper surface of the bottom portion 831*b* of the base member 831 and the lower surface of the sheet body portion 835*a* of the insulation sheet 835. This contributes to further reducing the axial thickness of the spindle motor 802.

Furthermore, the entire insulation sheet 835 is arranged radially inward of the inner circumferential surface of the rotor magnet 843. That is, the insulation sheet 835 is arranged so as not to overlap with the rotor magnet 843 in the axial direction. Therefore, even if the cover portion 835*b* of the insulation sheet 835 is bent upward, this does not lead to a contact between the insulation sheet 835 and the rotor magnet 843. Moreover, because there is no possibility that the insulation sheet 835 and the rotor magnet 843 will make contact with each other, there is no need to provide large axial clearance between the insulation sheet 835 and the rotor magnet 843. This contributes to further reducing the axial thickness of the spindle motor 802.

Figure 15:
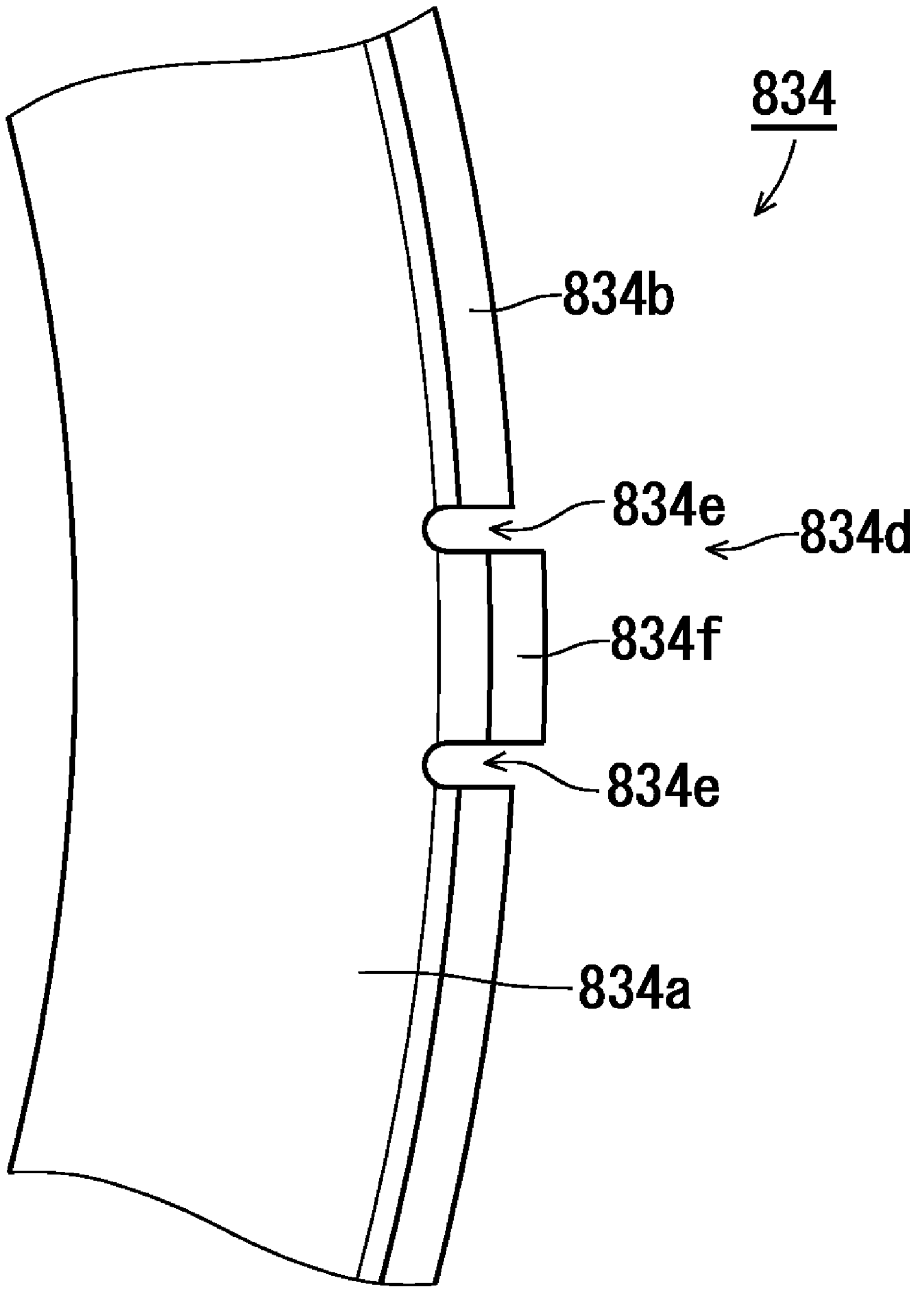
FIG. 15 is a partial top view of a thrust yoke according to a preferred embodiment of the present invention.
Figure 16:
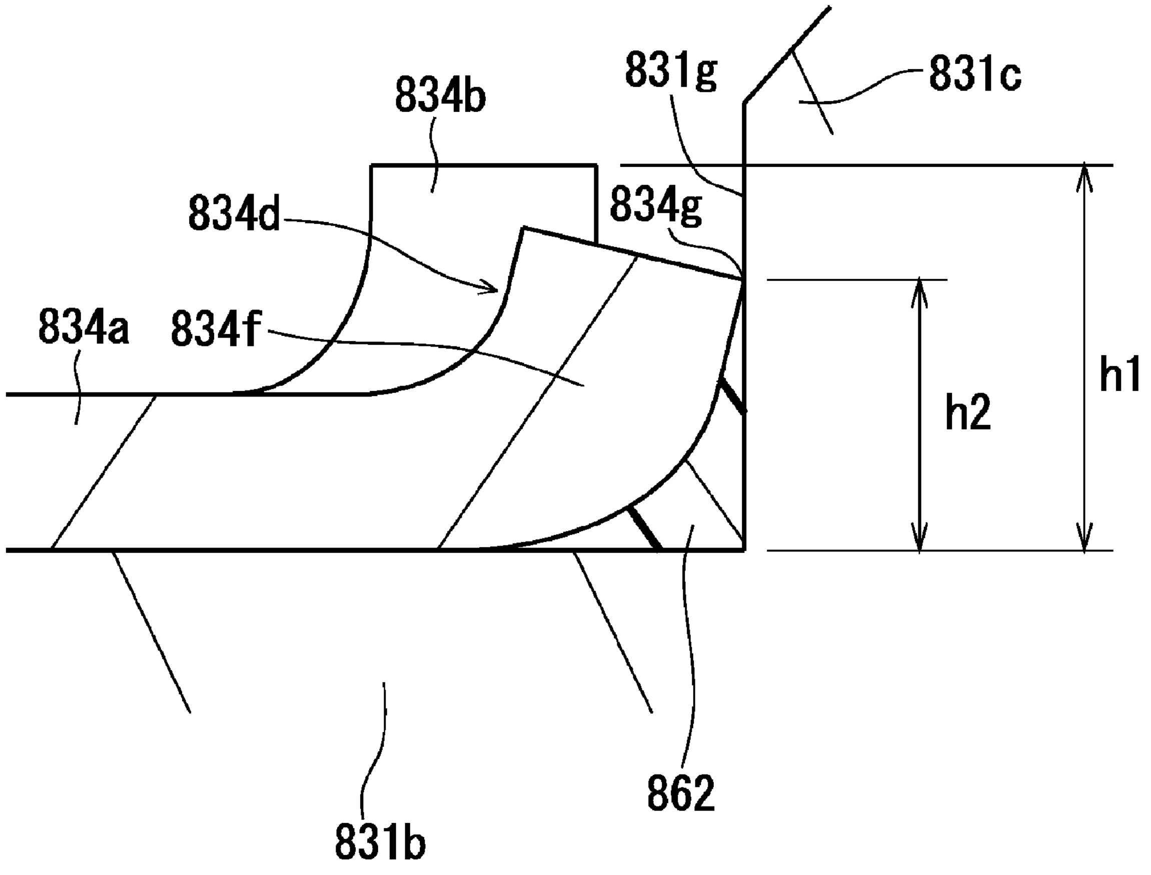
FIGS. 16, 17, and 18 are each a partial vertical cross-sectional view of a stationary portion according to a preferred embodiment of the present invention.

The thrust yoke 834 according to the present preferred embodiment has a mechanism to improve the strength with which the thrust yoke 834 is fixed to the base member 831. FIG. 15 is a partial top view of the thrust yoke 834. FIG. 16 is a partial vertical cross-sectional view of the stationary portion 803, illustrating an elastic section 834*f* of the thrust yoke 834 among other components.

As illustrated in FIGS. 15 and 16, the thrust yoke 834 includes a fixing portion 834*d*. The fixing portion 834*d* preferably includes a pair of notch portions 834*e* defined in the projecting portion 834*b*, and the elastic section 834*f* defined between the pair of notch portions 834*e*. The elastic section 834*f* is arranged to extend radially outward from the outer edge portion of the plate portion 834*a* while curving upward. A radially outer end portion of the elastic section 834*f* is positioned radially outward of an outer edge portion of the projecting portion 834*b*. The elastic section 834*f* is capable of bending in response to a stress received through the radially outer end portion thereof. That is, the elastic section 834*f* has flexibility.

The wall portion 831*c* of the base member 831 preferably includes a cylindrical surface 831*g* arranged opposite an outer circumferential surface of the thrust yoke 834. The cylindrical surface 831*g* corresponds to an example wall surface according to a preferred embodiment of the present invention. When the thrust yoke 834 is press fitted to the cylindrical surface 831*g* of the wall portion 831*c*, the elastic section 834*f* is brought into contact with the cylindrical surface 831*g*, and is bent radially inward. Resultant radial forces applied between the elastic section 834*f* and the cylindrical surface 831*g* cause the thrust yoke 834 to be securely fixed to the base member 831.

In order to obtain a high fixing strength as a result of the press fitting, it is preferable that a radial press-fit interference (allowance) for the press fitting of the thrust yoke 834 to the base member 831 be about 10 μm or more, more preferably about 20 μm or more, for example. Moreover, the radial press-fit interference for the press fitting of the thrust yoke 834 to the base member 831 is preferably about 200 μm or less, more preferably about 100 μm or less, for example, for increased ease of the press fitting.

More specifically, the elastic section 834$f$ has a corner portion 834$g$ thereof, i.e., a portion thereof positioned between an upper surface thereof and an outer circumferential surface thereof, arranged in contact with the cylindrical surface 831$g$ of the base member 831. The corner portion 834$g$ is pressed against the cylindrical surface 831$g$ through an elastic force of the elastic section 834$f$. When an upward force is applied to the thrust yoke 834, the elastic contact of the corner portion 834$g$ with the cylindrical surface 831$g$ contributes to preventing an upward movement of the thrust yoke 834. An upper end portion of the cylindrical surface 831$g$, which corresponds to the wall surface, is preferably positioned at a level higher than at least that of the corner portion 834$g$. More preferably, the upper end portion of the cylindrical surface 831$g$ is positioned at a level higher than that of an upper end portion of a portion of the projecting portion 834$b$ excluding the elastic section 834$f$. This arrangement allows the corner portion 834$g$ to be brought into contact with the cylindrical surface 831$g$ to further prevent the upward movement of the thrust yoke 834.

When the thrust yoke 834 is fixed to the base member 831, the elastic section 834$f$ is bent to an extent according to the dimensions of the cylindrical surface 831$g$ of the base member 831. This allows a decrease in a required precision of the dimensions of the cylindrical surface 831$g$ of the base member 831 as compared to when the thrust yoke 834 to be press fitted to the base member 831 is not provided with the elastic section 834$f$.

In addition, in the present preferred embodiment, the upper end portion of the elastic section 834$f$ (h2) is positioned at a level lower than that of the upper end portion of the portion of the projecting portion 834$b$ (h1) excluding the elastic section 834$f$ ($h2<h1$). This arrangement makes it easy, when press fitting the thrust yoke 834 to the base member 831, to press the upper end portion of the portion of the projecting portion 834$b$ excluding the elastic section 834$f$ without pressing the elastic section 834$f$. This makes it possible to fit the thrust yoke 834 to the base member 831 without applying an excessive downward external force to the elastic section 834$f$.

In the present preferred embodiment, the elastic section 834$f$ is defined between the pair of notch portions 834$e$. This enables the elastic section 834$f$ to have sufficient radial dimensions to exhibit sufficient flexibility, without making the elastic section 834$f$ excessively protrude radially outward, and also makes it possible to allow only the elastic section 834$f$ to bend while preventing other portions of the thrust yoke 834 from being deformed.

Furthermore, in the present preferred embodiment, a radially inner end portion of each notch portion 834$e$ is positioned radially inward of the outer edge portion of the plate portion 834$a$. This makes it possible to check a state of the fixing of the plate portion 834$a$ to the bottom portion 831$b$ of the base member 831. For example, it makes it possible to check whether there is a gap between the bottom portion 831$b$ and the plate portion 834$a$, a state of an adhesive applied between the bottom portion 831$b$ and the plate portion 834$a$, and the like.

The elastic section 834$f$ is preferably arranged radially outward of the rotor magnet 843. This allows an upper surface of the plate portion 834$a$, which is positioned radially inward of the notch portions 834$e$ of the thrust yoke 834, to be arranged axially opposite the lower surface of the rotor magnet 843. This contributes to improving the axial directivity of the magnetic attraction generated between the rotor magnet 843 and the thrust yoke 834.

Note that the fixing portion 834$d$ may be provided either at only one location or a plurality of locations in the thrust yoke 834. Note, however, that provision of the fixing portion 834$d$ at two or more locations, more preferably at three or more locations, in the thrust yoke 834 will lead to an improved precision of the relative position of the thrust yoke 834 with respect to the central axis 809.

In addition, an adhesive 862 is arranged between the base member 831 and the thrust yoke 834. The adhesive 862 contributes to the strength with which the base member 831 and the thrust yoke 834 are fixed to each other. That is, in the present preferred embodiment, the base member 831 and the thrust yoke 834 are fixed to each other by a combination of the press fitting and the adhesive 862, for example. Accordingly, the base member 831 and the thrust yoke 834 are fixed to each other more securely than when they are fixed to each other by only one of the press fitting and the adhesive 862.

The adhesive 862 may deteriorate with long-term use, due to influence of changes in ambient temperature and the like, resulting in a decrease in the fixing strength. In the present preferred embodiment, however, a portion of the fixing strength owing to the press fitting is maintained even after the deterioration of the adhesive 862. This contributes to reducing the probability of the thrust yoke 834 coming off the base member 831 due to the magnetic attraction between the thrust yoke 834 and the rotor magnet 843 after the deterioration of the adhesive 862.

Moreover, in the present preferred embodiment, a fixing strength required for the fixing of the thrust yoke 834 to the base member 831 does not need to be accomplished by only the adhesive 862. This leads to an increased number of options for the choice of the adhesive 862. It makes it possible, for example, to choose as the adhesive 862 an adhesive that takes a relatively long time to solidify, in order to facilitate an operation of application of the adhesive 862.

Moreover, in the present preferred embodiment, the elastic section 834$f$, which is a portion of the projecting portion 834$b$, is press fitted to the cylindrical surface 831$g$ of the base member 831. Therefore, a stress applied from the cylindrical surface 831$g$ during the press fitting is unlikely to reach the plate portion 834$a$ of the thrust yoke 834. This reduces the probability of a deformation of the plate portion 834$a$. This in turn reduces the probability that the axial distance between the plate portion 834$a$ and the rotor magnet 843 will vary at different positions.

Next, various example of a modifications of the second preferred embodiment will now be described below with a focus on differences from the above-described preferred embodiment.

Figure 17:
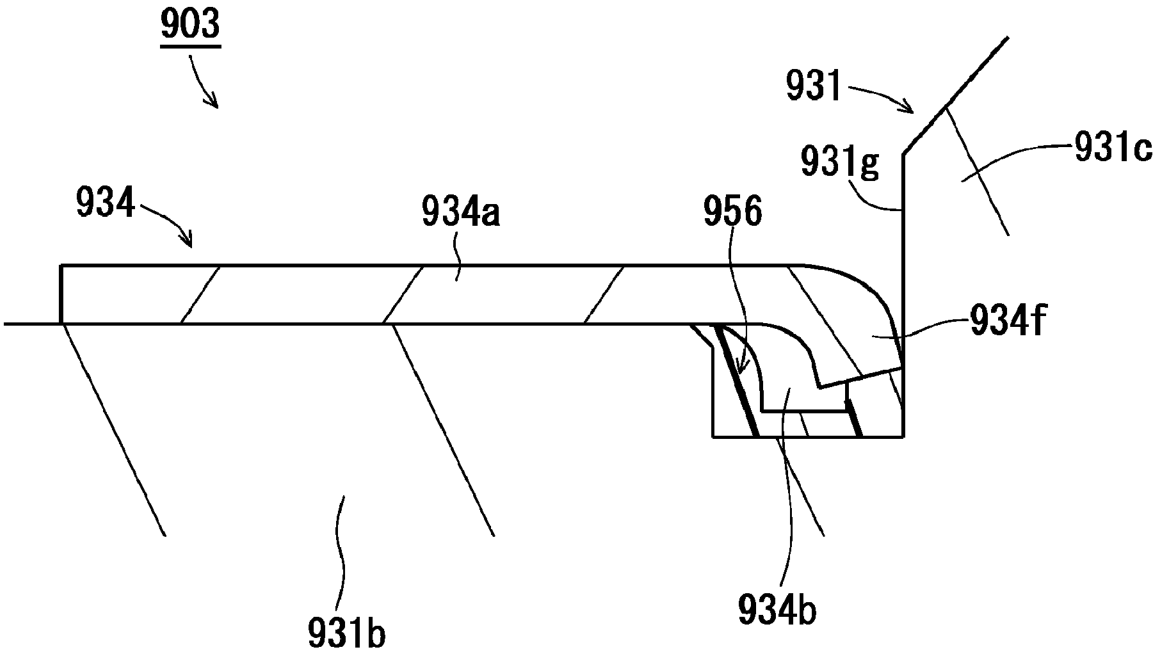

FIG. 17 is a partial vertical cross-sectional view of a stationary portion 903 according to an example of a modification of the second preferred embodiment. In the example of a modification illustrated in FIG. 17, a groove 956 is defined between a bottom portion 931$b$ and a wall portion 931$c$ of a base member 931. A radially outer end surface of the groove 956 includes an axially extending cylindrical surface 931$g$. Moreover, in the example of a modification illustrated in FIG. 17, a projecting portion 934$b$ of a thrust yoke 934 is arranged to extend downward from a radially outer edge portion of a plate portion 934$a$. Accordingly, a plurality of elastic sections 934$f$ are also arranged to extend downward from the radially outer edge portion of the plate portion 934$a$. The projecting portion 934$b$ of the thrust yoke 934 is press fitted to the base member 931 with the elastic sections 934$f$ arranged in contact with the cylindrical surface 931$g$.

Figure 18:
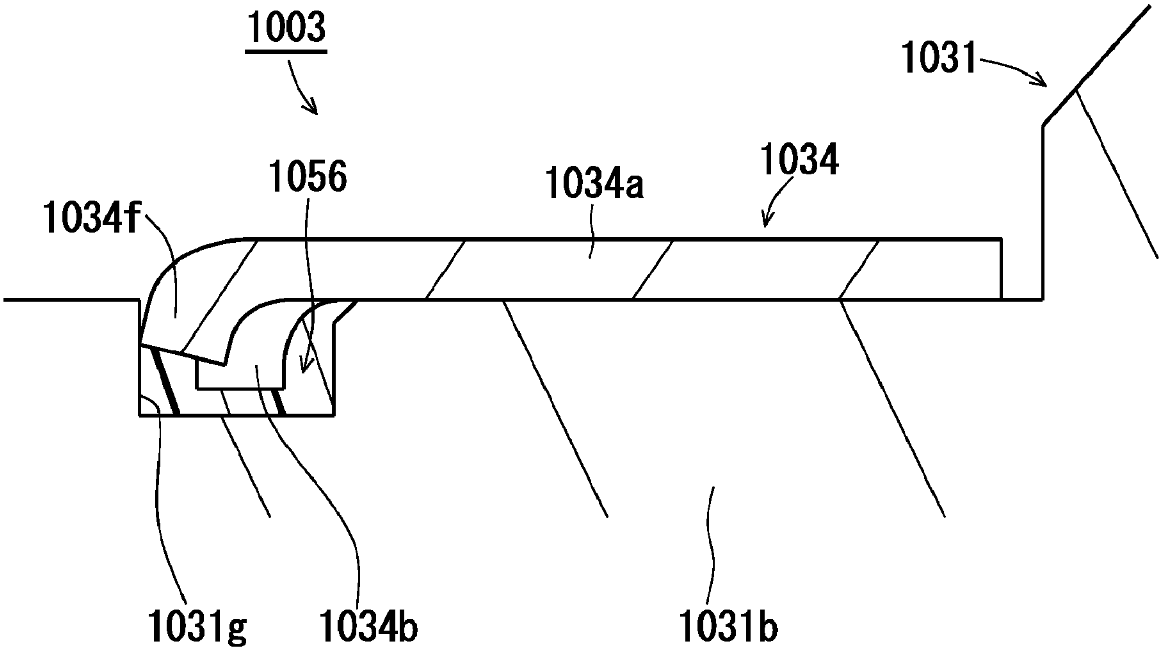

FIG. 18 is a partial vertical cross-sectional view of a stationary portion 1003 according to another example of a modification of the second preferred embodiment. In the example of a modification illustrated in FIG. 18, a groove 1056 is defined in a bottom portion 1031*b* of a base member 1031. A radially inner end surface of the groove 1056 includes an axially extending cylindrical surface 1031*g*. Moreover, in the example of a modification illustrated in FIG. 18, a projecting portion 1034*b* of a thrust yoke 1034 is arranged to extend downward from a radially inner edge portion of a plate portion 1034*a* of the thrust yoke 1034. Accordingly, a plurality of elastic sections 1034*f* are also arranged to extend downward from the radially inner edge portion of the plate portion 1034*a*. The projecting portion 1034*b* of the thrust yoke 1034 is press fitted to the base member 1031 with the elastic sections 1034*f* arranged in contact with the cylindrical surface 1031*g*.

In the case where the projecting portion is arranged to project downward from the plate portion as in the example of a modifications illustrated in FIGS. 17 and 18, an increase inflexibility in the arrangement of other members above the thrust yoke and in the design of the dimensions of such other members is achieved. In that case, it is easy to arrange the rotor magnet of the rotating portion close to the plate portion of the thrust yoke, for example. Moreover, in the example of a modifications illustrated in FIGS. 17 and 18, an adhesive may be held within the groove of the base member to achieve an increase in the fixing strength by the adhesive.

Note that each elastic section may not necessarily be arranged to extend in a single direction after projecting from the plate portion. For example, the elastic section may be provided with one or more bent portions in a vertical cross-section in order to improve the elastic force of the elastic section. That is, the elastic section is only required to include a portion projecting from the plate portion in the axial direction.

Also note that the projecting portion of the thrust yoke may be substantially in the shape of a cylinder as in the above-described preferred embodiments, and that the projecting portion of the thrust yoke may alternatively be defined by one or more axial projections provided at one or more circumferential positions. For example, the projecting portion of the thrust yoke may be defined by only one or more elastic sections. Also note that the wall surface of the base member may be a cylindrical surface as in the above-described preferred embodiments, and that the wall surface of the base member may alternatively be defined by one or more surfaces provided at one or more circumferential positions.

Also note that the thrust yoke may be fixed to the base member through only press fitting, without the use of an adhesive.

In spindle motors according to preferred embodiments of the present invention, the rotor magnet may be arranged radially outward of the stator unit as in the above-described preferred embodiments, or alternatively, the rotor magnet may be arranged radially inward of the stator unit.

Note that various preferred embodiments of the present invention are also applicable to spindle motors designed to rotate other types of disks than magnetic disks, e.g., an optical disk, as well as to disk drive apparatuses including such a spindle motor.

Also note that features of the above-described preferred embodiments and the above-described examples of modifications thereof may be combined as appropriate insofar as their features will not interfere with each other.

Also note that, in modifications of any of the above-described preferred embodiments and the above-described examples of modifications thereof, the insulation sheet and the coils may have an axial gap therebetween.

The present invention is applicable to spindle motors and disk drive apparatuses.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A spindle motor comprising:

a stationary portion; and a rotating portion arranged to rotate with respect to the stationary portion; wherein the rotating portion includes a magnet arranged around a central axis extending in a vertical direction;

the stationary portion includes:

a base member; and a magnetic member arranged below the magnet in the vertical direction and fixed to the base member;

the base member includes:

an upper surface extending out perpendicularly or substantially perpendicularly to the central axis; and a wall surface extending in an axial direction;

the magnetic member includes:

an annular plate portion arranged on the upper surface of the base member; and a projecting portion arranged to extend downward in the vertical direction from the plate portion;

at least a portion of the projecting portion is in contact with the wall surface; and the stationary portion further includes an adhesive arranged between the plate portion and the upper surface of the base member and between the projecting portion and the wall surface.

2. The spindle motor according to claim 1, wherein the adhesive extends to a radially outer end portion of the plate portion.

3. The spindle motor according to claim 2, wherein the adhesive extends to a lower end portion of the projecting portion.

4. The spindle motor according to claim 3, wherein the adhesive is arranged to cover the lower end portion of the projecting portion.

5. The spindle motor according to claim 3, wherein the adhesive is arranged to extend continuously from the radially outer end portion of the plate portion to the lower end portion of the projecting portion.

6. The spindle motor according to claim 1, wherein the adhesive is arranged to contact a lower end portion of the projecting portion.

7. The spindle motor according to claim 6, wherein the adhesive is arranged to cover the lower end portion of the projecting portion.

8. The spindle motor according to claim 1, wherein the base member includes an inclined surface defined between the upper surface and the wall surface; and the adhesive is arranged between the inclined surface and a portion of the magnetic member that is opposed to the inclined surface.

9. The spindle motor according to claim 8, wherein the adhesive is arranged to extend from a gap between the plate portion and the upper surface of the base member to a gap between the projecting portion and the wall surface through a gap between the inclined surface and the portion of the magnetic member which is opposed to the inclined surface.

10. The spindle motor according to claim 1, wherein the upper surface of the base member includes a metal surface exposed at least at a portion thereof positioned below the plate portion; and the adhesive is arranged between the plate portion and the exposed metal surface of the upper surface.

11. The spindle motor according to claim 10, wherein the wall surface of the base member includes an exposed metal surface; and the adhesive is arranged between the projecting portion and the exposed metal surface of the wall surface.

12. The spindle motor according to claim 1, wherein the wall surface of the base member includes an exposed metal surface; and the adhesive is arranged between the projecting portion and the exposed metal surface of the wall surface.

13. The spindle motor according to claim 1, wherein the projecting portion includes a raised portion defined in an outer circumferential surface or an inner circumferential surface of the projecting portion; and the raised portion is arranged to be in contact with the wall surface.

14. The spindle motor according to claim 13, wherein a plurality of raised portions are provided, and the raised portions are arranged along a circumferential direction.

15. The spindle motor according to claim 13, wherein the raised portion includes a curved surface.

16. The spindle motor according to claim 13, wherein the projecting portion further includes a concave portion defined in a surface thereof opposite to the surface thereof in which the raised portion is defined, the concave portion being defined at a position corresponding to the raised portion.

17. The spindle motor according to claim 1, wherein the base member includes a groove arranged to have the projecting portion accommodated therein; and the adhesive is arranged in the groove.

18. The spindle motor according to claim 1, wherein the stationary portion includes a plurality of coils; and an inner circumferential surface of the projecting portion is arranged radially inward of an inner circumferential surface of the magnet and radially outward of the coils.

19. The spindle motor according to claim 1, wherein an outer circumferential surface of the plate portion is arranged radially outward of an outer circumferential surface of the magnet.

20. A disk drive apparatus comprising:

a spindle motor including:

a stationary portion; and a rotating portion arranged to rotate with respect to the stationary portion;

an access portion arranged to perform at least one of reading and writing of information from or to a disk held by the rotating portion of the spindle motor; and a housing arranged to contain the spindle motor and the access portion; wherein the rotating portion includes a magnet arranged around a central axis extending in a vertical direction;

the stationary portion includes:

a base member; and a magnetic member arranged below the magnet in the vertical direction and fixed to the base member;

the base member includes:

an upper surface extending out perpendicularly or substantially perpendicularly to the central axis; and a wall surface extending in an axial direction;

the magnetic member includes:

an annular plate portion arranged on the upper surface of the base member; and a projecting portion arranged to extend downward in the vertical direction from the plate portion;

at least a portion of the projecting portion is in contact with the wall surface; and the stationary portion further includes an adhesive arranged between the plate portion and the upper surface of the base member and between the projecting portion and the wall surface.

* * * * *